US008755708B2

(12) United States Patent
Ogata et al.

(10) Patent No.: US 8,755,708 B2
(45) Date of Patent: Jun. 17, 2014

(54) IMAGE FORMING APPARATUS FOR DETECTING A HUMAN USING A HUMAN DETECTING DEVICE

(75) Inventors: Kenta Ogata, Kanagawa (JP); Susumu Yamashina, Kanagawa (JP); Motofumi Baba, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 142 days.

(21) Appl. No.: 13/303,215

(22) Filed: Nov. 23, 2011

(65) Prior Publication Data
US 2012/0328319 A1 Dec. 27, 2012

(30) Foreign Application Priority Data

Jun. 27, 2011 (JP) ................. 2011-142379

(51) Int. Cl.
*G03G 15/00* (2006.01)
*G03G 21/00* (2006.01)
(52) U.S. Cl.
USPC .............................. 399/75; 399/81
(58) Field of Classification Search
USPC ......................................... 399/75
See application file for complete search history.

(56) References Cited

U.S. PATENT DOCUMENTS

| | | | | |
|---|---|---|---|---|
| 2009/0316193 | A1* | 12/2009 | Kohara et al. | 358/1.15 |
| 2009/0316954 | A1* | 12/2009 | Kohara et al. | 382/103 |
| 2010/0231390 | A1* | 9/2010 | Hashimoto | 340/573.1 |
| 2012/0326038 | A1* | 12/2012 | Yamashina et al. | 250/338.3 |
| 2012/0327458 | A1* | 12/2012 | Baba et al. | 358/1.15 |

FOREIGN PATENT DOCUMENTS

| | | | |
|---|---|---|---|
| JP | 58168059 A | * | 10/1983 |
| JP | 06-242226 A | | 9/1994 |
| JP | 07-114308 A | | 5/1995 |
| JP | 07114308 A | * | 5/1995 |
| JP | 4077440 B2 | | 4/2008 |
| WO | WO 2010113075 A1 | * | 10/2010 |

* cited by examiner

*Primary Examiner* — David Gray
*Assistant Examiner* — Tyler Hardman
(74) *Attorney, Agent, or Firm* — Sughrue Mion, PLLC

(57) ABSTRACT

An image forming apparatus includes an image forming section that forms an image on a recording material; an image reading device that is disposed above the image forming section, and reads an image on an original; a connecting section that is disposed at either one of end sides of an apparatus housing in a lateral direction thereof, and that connects the image forming section and the image reading device to each other; an operating section that is disposed in front of the image reading device, and that is operated by a person; a human detecting device that detects the person operating the operating section; a discharging section that discharges the recording material on which the image has been formed by the image forming section to a placing section; and the placing section on which the recording material discharged from the discharging section is placed.

19 Claims, 17 Drawing Sheets

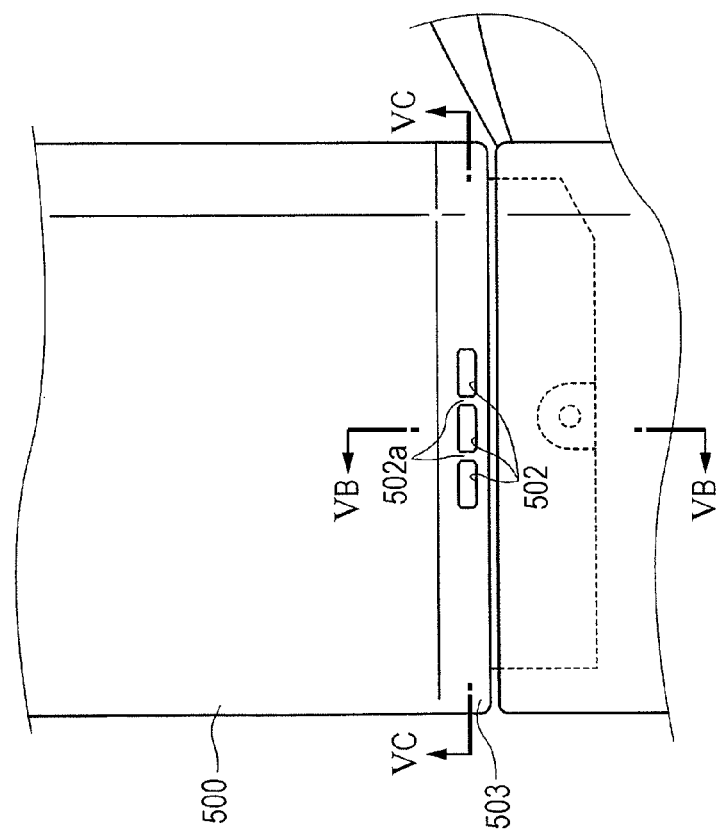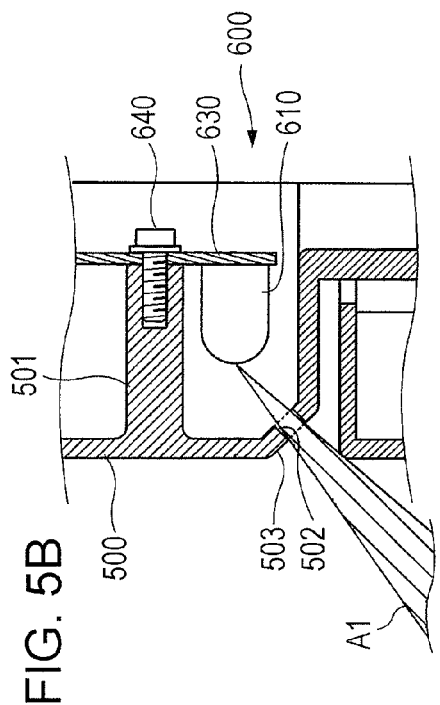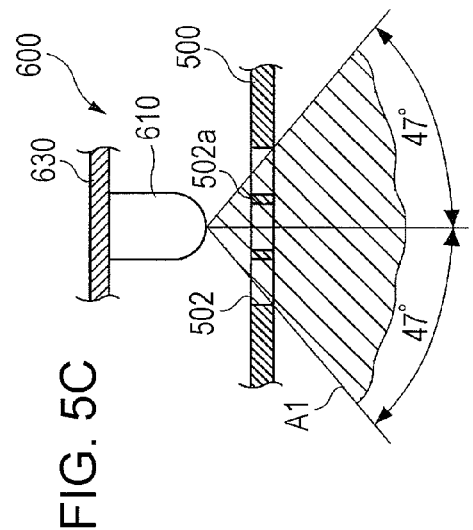

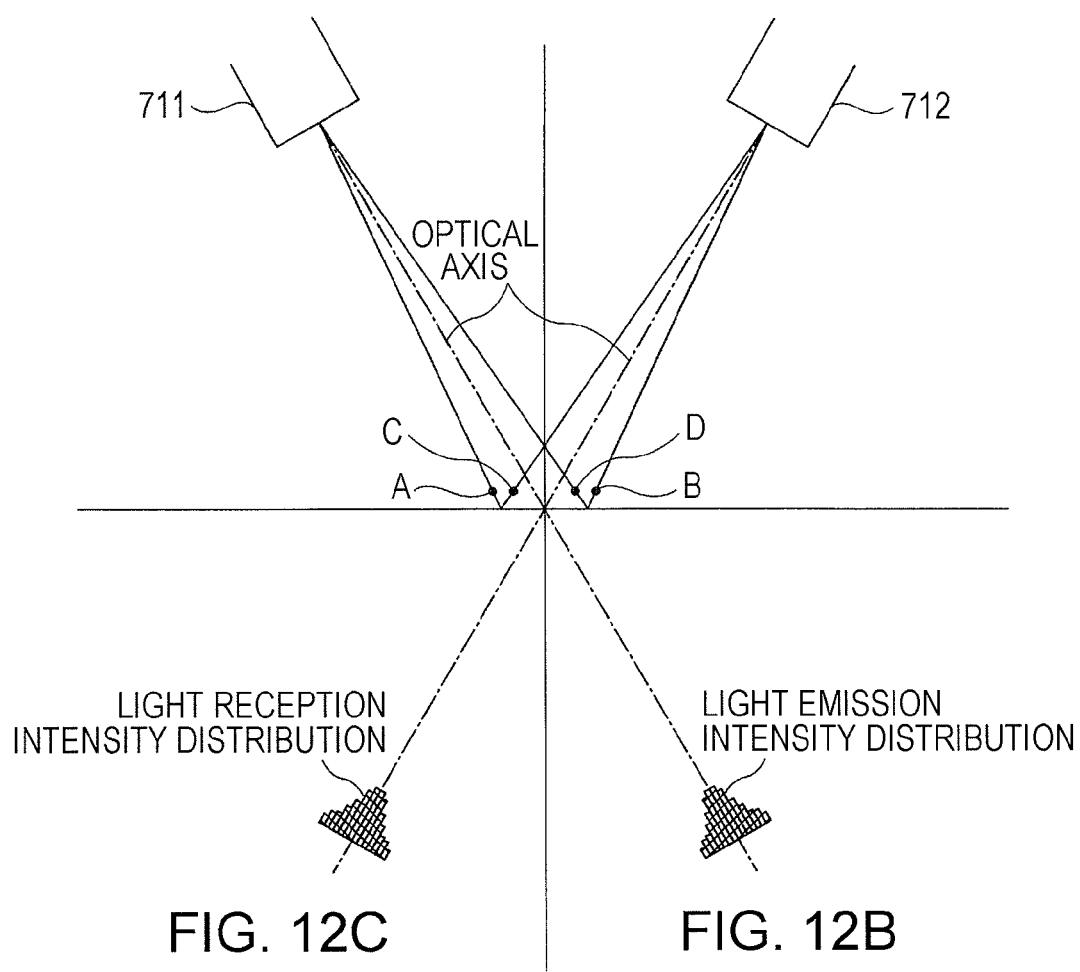

IMAGE FORMING APPARATUS FOR DETECTING A HUMAN USING A HUMAN DETECTING DEVICE

CROSS-REFERENCE TO RELATED APPLICATIONS

This application is based on and claims priority under 35 USC 119 from Japanese Patent Application No. 2011-142379 filed Jun. 27, 2011.

BACKGROUND (i) Technical Field

The present invention relates to an image forming apparatus.

(ii) Related Art

For saving energy, there has been hitherto proposed an apparatus that is set in a standby state while being set in an electric power consumption state in which an electric power consumption amount when the apparatus is not used is less than that when the apparatus is used, and that is restored from the standby state when a sensor detects that a person has approached the apparatus.

SUMMARY

According to an aspect of the invention, there is provided an image forming apparatus including an image forming section that forms an image on a recording material; an image reading device that is disposed above the image forming section, and that reads an image on an original; a connecting section that is disposed at either one of end sides of an apparatus housing in a lateral direction thereof, and that connects the image forming section and the image reading device to each other; an operating section that is disposed in front of the image reading device, the operating section being operated by a person; a human detecting device that detects the person operating the operating section; a discharging section that discharges the recording material on which the image has been formed by the image forming section to a placing section; and the placing section on which the recording material discharged from the discharging section is placed. The placing section is disposed between the image forming section and the image reading device. The discharging section is provided at a placing-section side of the connecting section. The human detecting device is disposed at a surface of the apparatus housing located at a front side of the one end side. A detection area of the human detecting device covers an area in front of the apparatus housing.

BRIEF DESCRIPTION OF THE DRAWINGS

Exemplary embodiments of the present invention will be described in detail based on the following figures, wherein:

FIG. 5A is an enlarged view of a portion VA shown in FIG. 1;

FIG. 5B is a sectional view of a portion taken along line VB-VB in FIG. 5A;

FIG. 5C is a sectional view of a portion taken along line VC-VC in FIG. 5A;

FIG. 12A shows an area where a light-emitting section of a reflecting sensor emits light and an area where a light-receiving section of the reflecting sensor receives the light;

FIG. 12B shows a light emission intensity distribution of the light-emitting section;

FIG. 12C shows a light reception intensity distribution of the light-receiving section;

DETAILED DESCRIPTION

Exemplary embodiments of the present invention will hereunder be described in detail with reference to the attached drawings.

Figure 1:
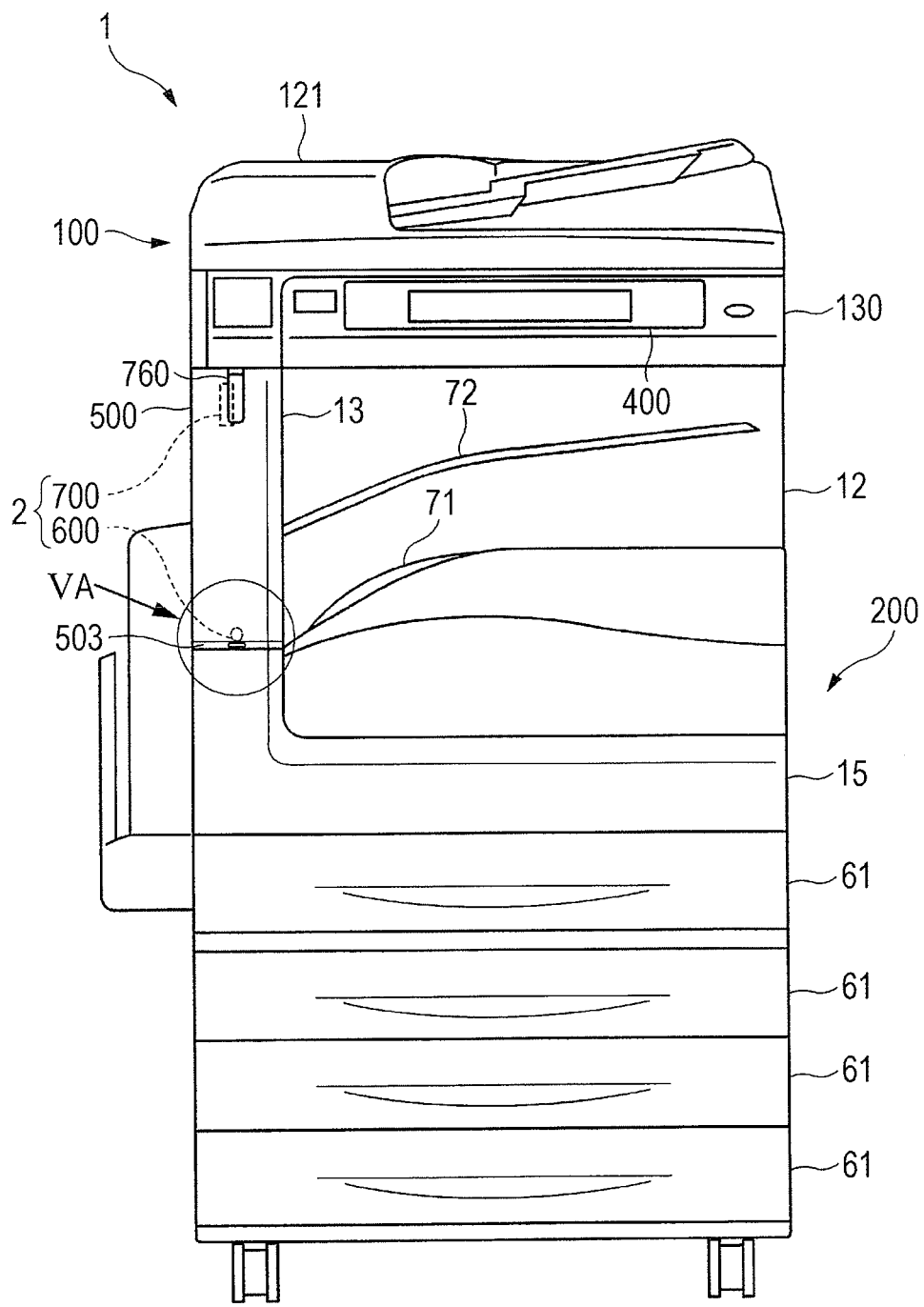
FIG. 1 is an external view of an image forming apparatus according to an exemplary embodiment.
Figure 2:
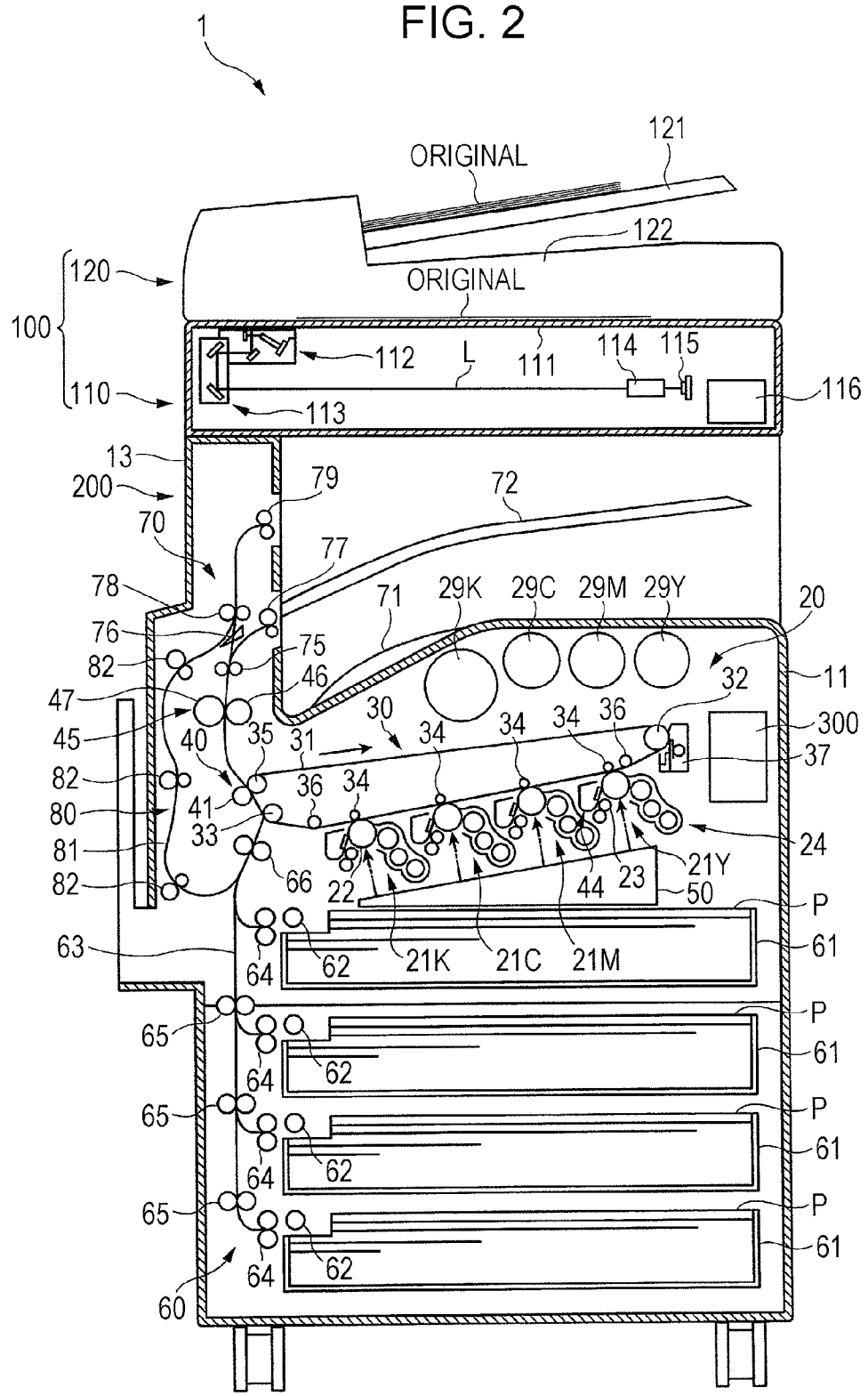
FIG. 2 shows an internal structure of the image forming apparatus according to the exemplary embodiment.

FIG. 1 is an external view of an image forming apparatus 1 according to an exemplary embodiment. FIG. 2 shows an internal structure of the image forming apparatus 1 according to the exemplary embodiment.

The image forming apparatus 1 includes an image reading device 100 that reads an image on an original, and an image recording device 200 that records the image onto a recording material (hereunder may typically be called "sheet"). The image forming apparatus 1 also includes a controlling device 300 and a user interface (UI) 400. The controlling device 300 includes a microcomputer (including, for example, a CPU, ROM, RAM), and controls the operation of the entire apparatus. The user interface (UI) 400 includes, for example, a touch panel. The user interface (UI) 400 outputs an instruction received from a user to the controlling device 300, and provides the user with information from the controlling device 300.

The image reading device 100 is disposed at an upper portion of the image forming apparatus 1. The image recording device 200 is disposed below the image reading device 100, and has the controlling device 300 built therein. The user interface 400 functions as an exemplary operating section that is operated by a person. The user interface 400 is disposed at a front side of the upper portion of the image forming apparatus 1, that is, at a front side of an image reading section 110 (described later) of the image reading device 100.

First, the image reading device 100 will be described.

The image reading device 100 includes the image reading section 110 that reads an image on an original, and an original transporting section 120 that transports the original to the image reading section 110. The original transporting section 120 is disposed at an upper portion of the image reading device 100. The image reading section 110 is disposed at a lower portion of the image reading device 100.

The original transporting section 120 includes an original placing section 121 upon which the original is placed, and an original discharging section 122 to which the original transported from the original placing section 121 is discharged. The original is transported from the original placing section 121 to the original discharging section 122.

The image reading section 110 includes a platen glass 111, a light irradiating unit 112, a light guiding unit 113, and an imaging lens 114. The light irradiating unit 112 causes a read surface (image surface) of the original to be irradiated with light. The light guiding unit 113 guides reflected light L reflected from the read surface of the original after the read surface of the original has been irradiated with the light L from the light irradiating unit 112. The imaging lens 114 performs imaging on an optical image of the light L guided by the light guiding unit 113. The image reading section 110 also includes a detecting section 115 and an image processing section 116. The detecting section 115 includes a photoelectric conversion element, such as a charged coupled device (CCD) image sensor, that performs photoelectric conversion on the light L subjected to the imaging by the imaging lens 114. The detecting section 115 detects the optical image subjected to the imaging. The image processing section 116 is electrically connected to the detecting section 115. An electrical signal obtained by the detecting section 115 is sent to the image processing section 116.

The image reading section 110 reads the image on the original transported by the image transporting section 120, and the image on the original placed on the platen glass 111.

Next, the image recording device 200 will be described.

The image recording device 200 includes an image forming section 20 that forms an image on a sheet P, a sheet supplying section 60 that supplies the sheet P to the image forming section 20, a sheet discharging section 70 to which the sheet P on which the image is formed at the image forming section 20 is discharged, and a reversing/transporting section 80 that reverses the front surface and back surface of the sheet P on whose one surface the image is formed at the image forming section 20, and that re-transports the sheet P towards the image forming section 20.

The image forming section 20 includes four image forming units 21Y, 21M, 21C, and 21K for yellow (Y), magenta (M), cyan (C), and black (K). These imaging forming units 21Y, 21M, 21C, and 21K are disposed in parallel and apart from each other at a certain interval. Each image forming unit 21 includes a photoconductor drum 22, a charger 23, and a developing unit 24. Each charger 23 uniformly charges the surface of its corresponding photoconductor drum 22. Using predetermined color component toner, each developing unit 24 develops and makes visible an electrostatic latent image formed by laser irradiation performed by an optical system unit 50 (described later). The image forming section 20 is provided with toner cartridges 29Y, 29M, 29C, and 29K for supplying toners of respective colors to the developing units 24 of the respective image forming units 21Y, 21M, 21C, and 21K.

The image forming section 20 also includes the optical system unit 50 disposed below the image forming units 21Y, 21M, 21C, and 21K. The optical system unit 50 illuminates the photoconductor drums 22 of the image forming units 21Y, 21M, 21C, and 21K with laser light. In addition to, for example, a modulator and a semiconductor laser (not shown), the optical system unit 50 includes a polygon mirror (not shown), a window (not shown), and a frame (not shown). The polygon mirror deflects the laser light emitted from the semiconductor laser for scanning. The window is formed of glass, and passes the laser light therethrough. The frame hermetically seals each structural member.

The image forming section 20 further includes an intermediate transfer unit 30, a second transfer unit 40, and a fixing device 45. The intermediate transfer unit 30 causes toner images of the respective colors, formed on the photoconductor drums 22 of the respective image forming units 21Y, 21M, 21C, and 21K, to be superimposed upon and transferred to an intermediate transfer belt 31. The second transfer unit 40 transfers to a sheet P the superimposed toner images formed on the intermediate transfer unit 30. The fixing device 45 heats and presses the toner images formed on the sheet P to fix the toner images.

The intermediate transfer unit 30 includes the intermediate transfer belt 31, a drive roller 32, and a tension roller 33. The drive roller 32 drives the intermediate transfer belt 31. The tension roller 33 applies a certain tension to the intermediate transfer belt 31. The intermediate transfer unit 30 also includes first transfer rollers 34 (four first transfer rollers 34 in the exemplary embodiment) and a backup roller 35. The first transfer rollers 34 oppose the respective photoconductor drums 22 with the intermediate transfer belt 31 being disposed therebetween, and transfer the toner images formed on the photoconductor drums 22 to the intermediate transfer belt 31. The backup roller 35 opposes a second transfer roller 41 (described later) with the intermediate transfer belt 31 being disposed therebetween.

The intermediate transfer belt 31 is placed in a tensioned state upon rotating members, such as the drive roller 32, the tension roller 33, the first transfer rollers 34, the backup roller 35, and a driven roller 36. The drive roller 32 rotationally driven by a driving motor (not shown) causes the intermediate transfer belt 31 to be circulated and driven at a predetermined velocity in the direction of an arrow. As the intermediate transfer belt 31, a belt that is formed of, for example, rubber or resin is used.

The intermediate transfer unit 30 is provided with a cleaning device 37 that removes, for example, residual toner on the intermediate transfer belt 31. The cleaning device 37 removes, for example, residual toner or dust from the surface of the intermediate transfer belt 31 after completing the transfer of the toner images thereto.

The second transfer unit 40 includes the second transfer roller 41 that is disposed at a second transfer position, and that transfers the images to a sheet P by a second transfer operation by pressing the backup roller 35 with the intermediate transfer belt 31 being disposed between the backup roller 35 and the second transfer roller 41. The second transfer roller 41 and the backup roller 35, opposing the second transfer roller 41 with the intermediate transfer belt 31 being disposed between the second transfer roller 41 and the backup roller 35, define the second transfer position where the toner images transferred to the intermediate transfer belt 31 are transferred to the sheet P.

The fixing device 45 fixes to the sheet P the toner images, formed on the sheet P as a result of the second transfer using the intermediate transfer unit 30, using heat and pressure by a heating fixing roller 46 and a pressure roller 47.

The sheet supplying section 60 includes sheet holding sections 61, send-out rollers 62, a transport path 63, and transport rollers 64, 65, and 66. The sheet holding sections 61 hold sheets P on which images are to be recorded. The send-out rollers 62 send out the sheets P held in the sheet holding sections 61. The sheets P sent out by the send-out rollers 62 are transported along the transport path 63. The transport rollers 64, 65, and 66 are disposed along the transport path 63, and transport to the second transfer position the sheets P sent out by the send-out rollers 62.

The sheet discharging section 70 includes a first tray 71 and a second tray 72. The first tray 71 is provided above the image forming section 20, and is for placing thereupon sheets on which images have been formed at the image forming section 20. The second tray 72 is provided between the first tray 71 and the image reading device 100, and is for placing thereupon sheets on which images have been formed at the image forming section 20.

The sheet discharging section 70 is provided with transport rollers 75 and a switching gate 76. The transport rollers 75 are provided downstream from the fixing device 45 in a transport direction, and transport sheets P to which toner images have been fixed. The switching gate 76 is provided downstream from the transport rollers 75 in the transport direction, and switches transport directions of the sheets P. The sheet discharging section 70 is also provided with first discharge rollers 77. The first discharge rollers 77 are disposed downstream from the switching gate 76 in the transport direction, and discharge to the first tray 71a sheet P transported to one side (that is, the right side in FIG. 2) of the transport direction switched by the switching gate 76. The sheet discharging section 70 is also provided with transport rollers 78 and second discharge rollers 79, which are disposed downstream from the switching gate 76 in the transport direction. The transport rollers 78 transport a sheet P transported to another side (that is, the upper side in FIG. 2) of the transport direction switched by the switching gate 76. The second discharge rollers 79 discharge to the second tray 72 the sheet P transported by the transport rollers 78.

The reversing/transporting section 80 includes a reversing/transport path 81 provided beside the fixing device 45. A sheet P that has been reversed by rotating the transport rollers 78 in a direction opposite to the direction in which the sheet P is discharged to the second tray 72 is transported along the reversing/transport path 81. Transport rollers 82 are provided along the reversing/transport path 81. The sheet P transported by these transport rollers 82 is sent again to the second transfer position by the transport rollers 82.

The image recording device 200 includes an apparatus body frame 11 and an apparatus housing 12. The apparatus body frame 11 directly or indirectly supports the image forming section 20, the sheet supplying section 60, the sheet discharging section 70, the reversing/transporting section 80, and the controlling device 300. The apparatus housing 12 is mounted to the apparatus body frame 11, and forms an outer surface of the image forming apparatus 1.

At one end portion side of the image forming apparatus 1 in a lateral direction, the apparatus body frame 11 is provided with a reading device supporting section 13 including therein, for example, the switching gate 76, the first discharge rollers 77, the transport rollers 78, and the second discharge rollers 79, and extending vertically and supporting the image reading device 100. The reading device supporting section 13 supports the image reading device 100 in cooperation with an inner-side member in the apparatus body frame 11.

The image recording device 200 is also provided with a front cover 15 provided in front of the image forming section 20 so as to serve as a portion of the apparatus housing 12. The front cover 15 is openably and closably mounted to the apparatus body frame 11.

Figure 3:
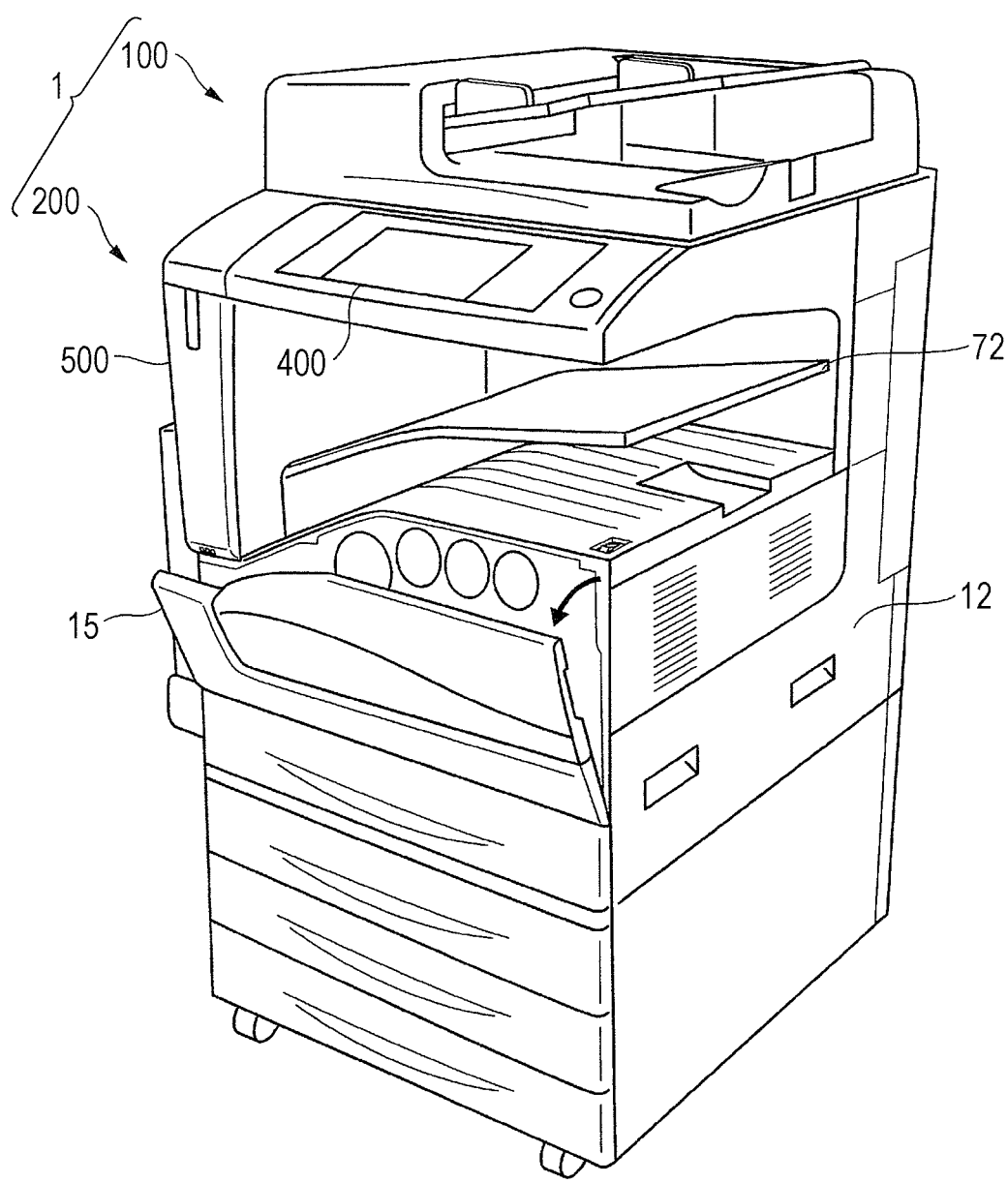
FIG. 3 shows a state in which a front cover is open.

FIG. 3 shows a state in which the front cover 15 is open.

When a user opens the front cover 15, it is possible to replace, for example, the toner cartridges 29Y, 29M, 29C, and 29K and the intermediate transfer unit 30 of the image forming section 20 with new ones.

The image forming apparatus 1 having the above-described structure operates as follows.

Images on originals read by the image reading device 100 and image data received from, for example, a personal computer (not shown) are subjected to a predetermined image processing operation. The image data subjected to the image processing operation is converted into pieces of colorant color-tone data for four colors, yellow (Y), magenta (M), cyan (C), and black (K), and the pieces of colorant color-tone data are output to the optical system unit 50.

The optical system unit 50 emits laser light emitted from a semiconductor laser (not shown) in accordance with the input colorant color-tone data to the polygon mirror through a f-θ lens (not shown). At the polygon mirror, the incident laser light is modulated in accordance with the pieces of color-tone data for the respective colors, is deflected for scanning, and illuminates the photoconductor drums 22 of the respective image forming units 21Y, 21M, 21C, and 21K through mirrors (not shown) and imaging lenses (not shown).

The surfaces of the photoconductor drums 22 of the respective image forming units 21Y, 21M, 21C, and 21K that have been charged by the respective chargers 23 are scanned and exposed, so that electrostatic latent images are formed. The formed electrostatic latent images are developed into toner images of the respective colors, yellow (Y), magenta (M), cyan (C), and black (K), by the respective image forming units 21Y, 21M, 21C, and 21K. The toner images, formed on the photoconductor drums 22 of the image forming units 21Y, 21M, 21C, and 21K, are superimposed upon and transferred to the intermediate transfer belt 31 (serving as an intermediate transfer body).

At the sheet supplying section 60, in accordance with an image formation timing, the send-out rollers 62 rotate and pick up sheets P in the sheet holding sections 61. The picked up sheets P are transported along the transport path 63 by the transport rollers 64 and 65. Thereafter, in accordance with a timing of movement of the intermediate transfer belt 31 on which the toner images are formed, the transport rollers 66 rotate, so that the sheets P are transported to the second transfer position (formed by the backup roller 35 and the second transfer roller 41). At the second transfer position, using a press-contact force and a predetermined electric field, the toner images for the four colors that are superimposed upon each other are successively transferred in a subscanning direction to the sheet P that is being transported upward. The sheet P to which the toner images of the respective colors have been transferred is discharged to and placed upon the first tray 71 or the second tray 72 after the toner images have been fixed using the heat and the pressure by the fixing device 45.

If duplex printing is required, a sheet P having an image formed on one surface thereof is transported so that its front and back are reversed by the reversing/transporting section 80, and is transported again to the second transfer position. Then, toner images are transferred to the other surface of the sheet P at the second transfer position. Then, the fixing device 45 fixes the transferred images. Thereafter, the sheet P having the images formed on both surfaces thereof is discharged and placed upon the first tray 71 or the second tray 72.

Next, electric power modes of the image forming apparatus 1 will be described.

The image forming apparatus 1 is provided with electric power modes (operation modes) for different electric power consumptions. Exemplary electric power modes include a warmup mode, a run mode, a standby mode, and a sleep mode. The warmup mode is for when a power supply of the image forming apparatus 1 is turned on as a result of turning on a power supply switch. The run mode is for when a job that has occurred is executed. The standby mode is for standing by for a job that may occur. The sleep mode is set for reducing the electric power consumption amount. The run mode and the standby mode may hereunder be referred to as normal mode in which operations are performed in normal operation states. In the sleep mode, the supply of electric power to, for example, the image forming section 20 is stopped, or the electrical energy is less than that in the normal mode. This causes the electric power consumption amount in the sleep mode to be less than that in the normal mode.

When the image forming apparatus 1 includes an authenticating device, such as an IC card reader, for user authentication, electric power is supplied to the authenticating device in the standby mode.

The controlling device 300 is restored to the normal mode from the sleep mode when a predetermined restoration condition is established. Exemplary restoration conditions may include reception (obtainment) of data from an external device and reception (obtainment) of a signal transmitted from a second human detecting section 700 of a human detecting device 2 (described later) indicating that a person is detected.

When a predetermined sleep-mode condition has been established, the controlling device 300 causes the ordinary mode to be changed to the sleep mode. Sleep-mode conditions include completion of a job regarding the data received (obtained) from the external device, reception (obtainment) of a signal (non-detection signal) transmitted from the second human detecting section 700 of the human detecting device 2 (described later) indicating that a person is no longer detected, and passage of a predetermined period from the reception (obtainment) of the non-detection signal from the second human detecting section 700.

Accordingly, the controlling device 300 functions as an exemplary switching unit that switches between the normal mode (first electric power mode) and the sleep mode (second electric power mode).

Next, a mechanism that detects a person (human body) and that is restored from the sleep mode to the normal mode will be described.

The image forming apparatus 1 includes the human detecting device 2 (see FIG. 1) that detects a person (human body). The human detecting device 2 includes a first human detecting section 600, to which electric power is normally supplied even in the sleep mode and that detects that a person has entered a predetermined area, and the second human detecting section 700, to which electric power is supplied when the first human detecting section 600 has detected the entry of a person and that detects that the person exists in the predetermined area. When the second human detecting section 700 detects that the person exists in the predetermined area, the second human detecting section 700 outputs a signal indicating that the person exists in the predetermined area to the controlling device 300.

Here, the image forming apparatus 1 includes a supporting section cover 500 in front of the reading device supporting section 13. The supporting section cover 500 covers the front side of the reading device supporting section 13. The supporting section cover 500 functions as an outer-surface formation member that is a portion of the apparatus housing 12, and that covers an outer surface at the front side of the apparatus where a person that operates the user interface 400 is assumed to be positioned. The supporting section cover 500 is a plate-like member, and is either directly or indirectly secured to the apparatus body frame 11. The human detecting device 2 is mounted to the underside of the supporting section cover 500.

First, the first human detecting section 600 will be described.

The first human detecting section 600 detects that a person has entered a predetermined area (detection area A1 shown in each of FIGS. 6A to 6C) as a result of, by making use of pyroelectric effect, detecting infrared rays of a particular wavelength emitted by the person. The first human detecting section 600 is provided with, for example, a pyroelectric element, a lens, an IC, and a printed board. The first human detecting section 600 includes a pyroelectric sensor 610 and a first substrate 630. When the amount of change of infrared rays occurring when the person moves is detected, and the detected amount of change exceeds a predetermined reference value, the pyroelectric sensor 610 detects that a person has entered the predetermined area. The first substrate 630 is a printed board to which the pyroelectric sensor 610 is mounted.

When the pyroelectric sensor 610 is mounted to the first substrate 630, and detects that a person has entered the predetermined area, the pyroelectric sensor 610 outputs a signal indicating that it has detected that a person has entered the predetermined area.

Figure 4:
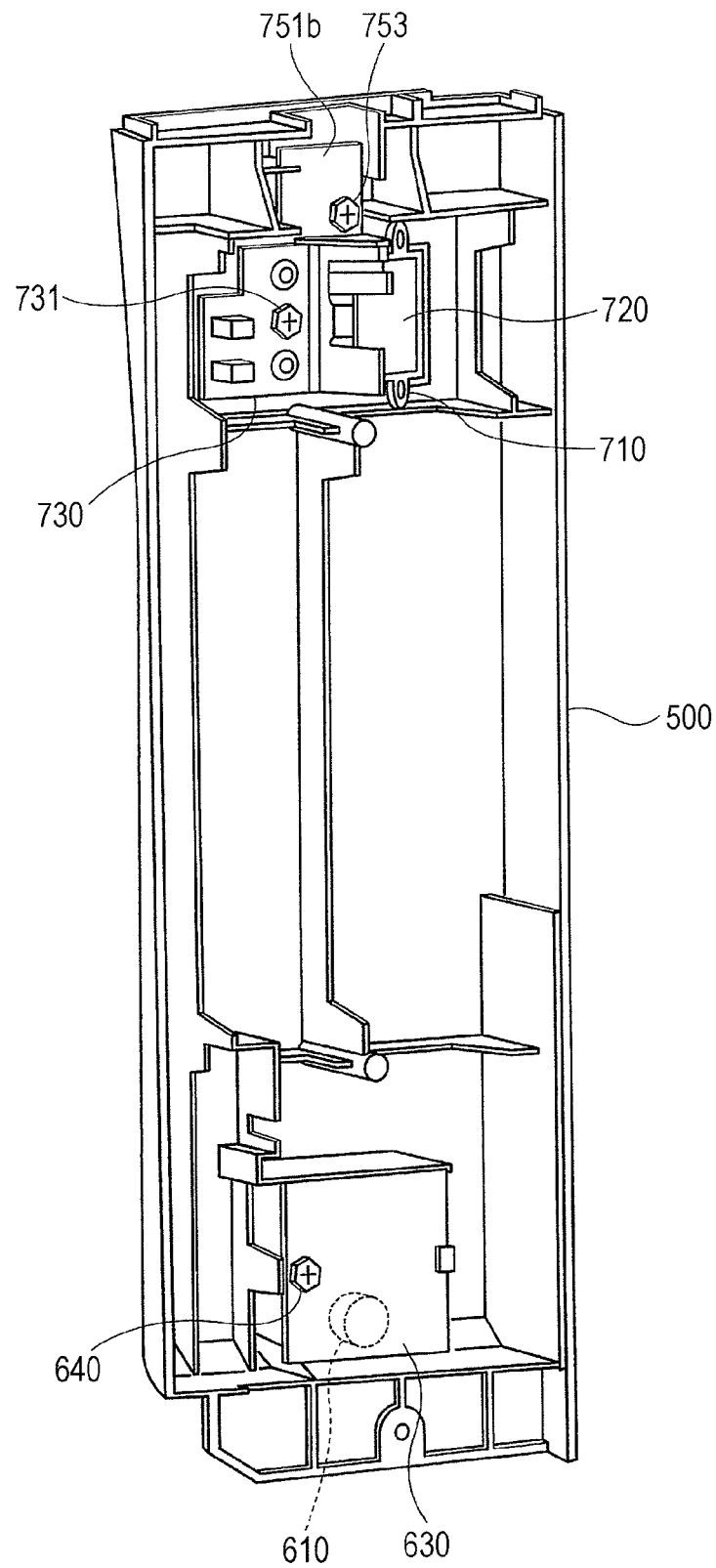
FIG. 4 is a back view of a supporting section cover.

FIG. 4 is a back view of the supporting section cover 500.

As shown in FIG. 4, the first substrate 630 is secured to the back side of the supporting section cover 500 with a bolt 640. This causes the pyroelectric sensor 610, mounted to the front side of the first substrate 630, to be indirectly secured to the apparatus body frame 11.

FIG. 5A is an enlarged view of a portion VA shown in FIG. 1. FIG. 5B is a sectional view of a portion taken along line VB-VB in FIG. 5A. FIG. 5C is a sectional view of a portion taken along line VC-VC in FIG. 5A.

Figure 6C:
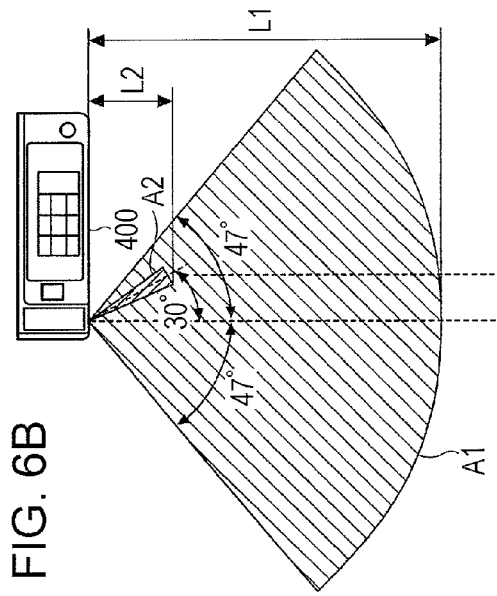
FIGS. 6A to 6C each show detection areas of a human detecting device in the image forming apparatus according to the exemplary embodiment.
Figure 6A:
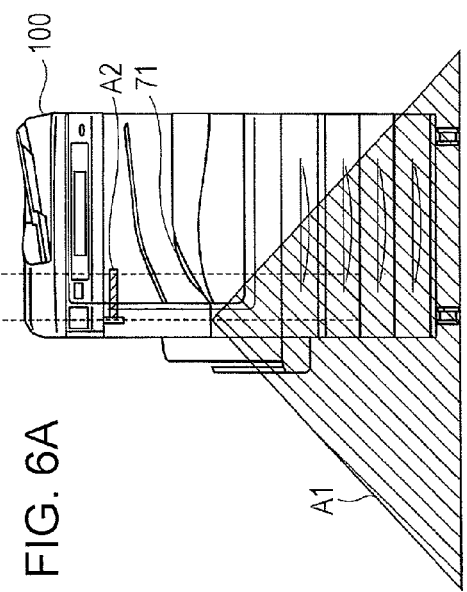
Figure 6B:
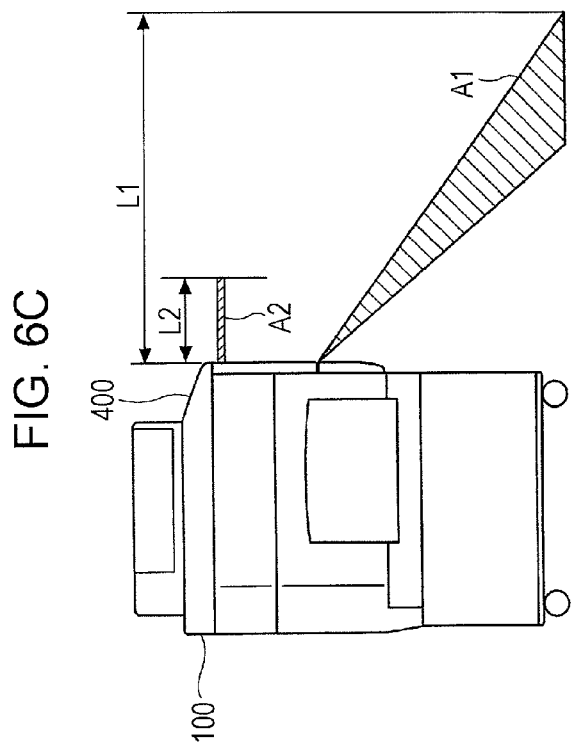

FIGS. 6A to 6C each show detection areas of the human detecting device 2 in the image forming apparatus 1 according to the exemplary embodiment. FIG. 6A is a front view of the image forming apparatus 1. FIG. 6B is a top view of the image forming apparatus 1. FIG. 6C is a lateral-direction view of the image forming apparatus 1.

The supporting section cover 500 is formed using a stationary die and a movable die that is movable with respect to the stationary die. The supporting section cover 500 is mounted to the apparatus body frame 11 so as to be oriented parallel to a horizontal direction corresponding to a direction in which the movable die moves relative to the stationary die from a far side to a near side. An internally threaded portion 501 into which the bolt 640 for tightening the first substrate 630 is screwed faces the supporting section cover 500 so that the direction of a central line thereof is parallel to the direction in which the movable die moves relative to the stationary die.

The pyroelectric sensor 610 is mounted to the supporting section cover 500 using the first substrate 630 so that the direction of a central line of the pyroelectric sensor 610 is set in the direction of the central line of the internally threaded portion 501, that is, in the horizontal direction extending from the far side to the near side. The detection area of the pyroelectric sensor 610 is 47 degrees from a central line in all directions. That is, when the direction in which a detection surface is oriented is the central direction, the angular range of 47 degrees from the central line in all directions corresponds to the detection area of the pyroelectric sensor 610.

In the image forming apparatus 1 according to the exemplary embodiment, by disposing the supporting section cover 500 in front of the pyroelectric sensor 610, the detection area of the pyroelectric sensor 610 is limited to the range shown by the shaded portion in each of FIGS. 6A to 6C. This range is defined as a detection area A1 of the first human detecting section 600.

That is, the supporting section cover 500 is disposed in front of the pyroelectric sensor 610. In the vertical direction, openings 502 (serving as exemplary through holes extending only through portions of the supporting section cover 500 that are positioned below the central position of the pyroelectric sensor 610) are formed in the supporting section cover 500. Other than the portions where the openings 502 are formed, the supporting section cover 500 covers the pyroelectric sensor 610. As shown in FIGS. 6A to 6C, the positions of the openings 502 with respect to the pyroelectric sensor 610 are determined so that a distance in the horizontal direction from the far side to the near side from the front side of the image forming apparatus 1 at a floor surface on which the image forming apparatus 1 is placed is a prescribed distance L1. The prescribed distance L1 may be, for example, 0.85 m (850 mm). When the image forming apparatus 1 is viewed from the front as shown in FIG. 1, the supporting section cover 500 has an inclined portion 503 that inclines obliquely downward towards the far side with respect to a horizontal plane. The openings 502 are formed in the inclined portion 503.

With regard to a detection area in a lateral direction, both end portions of the openings 502 in the lateral direction are positioned so as not to block the angular range of 47 degrees towards the left and right from the central direction in which the detection surface of the pyroelectric sensor 610 is oriented. However, ribs 502a that connect upper walls and lower walls of the openings 502 are formed at portions defining the openings 520 in the lateral direction.

By this, the detection area A1 of the first human detecting section 600 in the image forming apparatus 1 according to the exemplary embodiment is an area that is set obliquely downward from the horizontal plane as shown by the shaded portion in each of FIGS. 6A to 6C. By disposing the supporting section cover 500 in front of the pyroelectric sensor 610 and covering a portion of the detection area of the pyroelectric sensor 610, it is possible to detect only an area that that is situated obliquely downward from the position of the pyroelectric sensor 610. Therefore, detection of a person who is not expected to use the image forming apparatus 1, such as a person who passes the image forming apparatus 1, when the detection area A1 of the first human detecting section 600 is made wide is capable of being suppressed.

Since the openings 502 are formed in the inclined portion 503 that is inclined obliquely downward towards the far side with respect to the horizontal plane of the supporting section cover 500, it is difficult for a user to see the openings 502 and the pyroelectric sensor 610. This suppresses the spoiling of the esthetic of the appearance of the image forming apparatus 1 caused by the existence of the openings 502. In the first human detecting section 600, an area in front of the image forming apparatus 1 is the detection area A1, and the first tray 71 and the second tray 72 are not defined as detection areas. Therefore, detections by the first human detecting section 600 of sheets P that are discharged towards the trays 71 and 72 are suppressed. In addition, the pyroelectric sensor 610 is disposed so that its central direction is parallel to a horizontal line extending from the far side to the near side. Therefore, compared to a structure in which the central direction is inclined with respect to the horizontal line, it is possible to facilitate assembly of the pyroelectric sensor 610 and the first substrate 630 to the supporting section cover 500, and to form the supporting section cover 500 with an easily formable shape.

Next, the second human detecting section 700 will be described.

Figure 7:
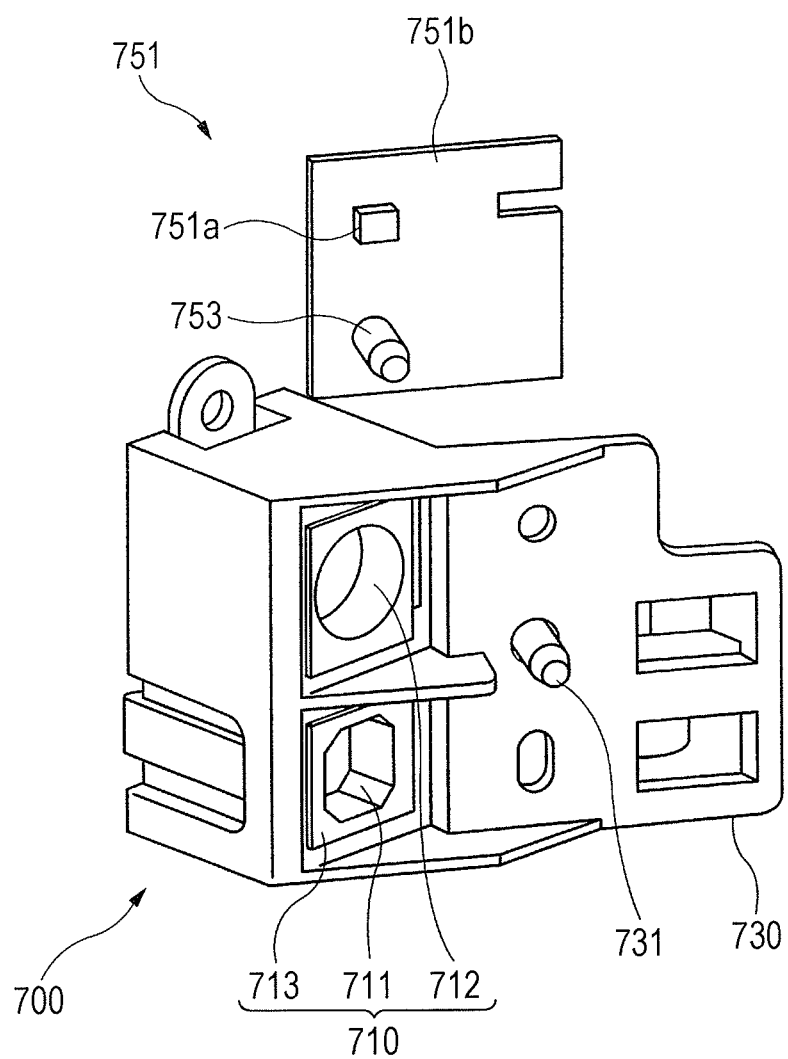
FIG. 7 shows a schematic structure of a second human detecting section.

FIG. 7 shows a schematic structure of the second human detecting section 700. FIG. 4 also shows a state in which the second human detecting section 700 is mounted to the back side of the supporting section cover 500.

The second human detecting section 700 includes an infrared reflecting sensor 710, a reflecting sensor substrate 720 (see FIG. 4), and a supporting member 730. The reflecting sensor 710 includes a light-emitting element and a light-receiving element. The reflecting sensor substrate 720 is a printed board to which the reflecting sensor 710 is mounted. The supporting member 730 supports the reflecting sensor 710 and the reflecting sensor substrate 720.

The reflecting sensor 710 includes a light-emitting section 711, a light-receiving section 712, a housing 713, and a harness (not shown). The light-emitting section 711 emits light using an infrared-emitting diode serving as the light-emitting element. The light-receiving section 712 uses a photodiode serving as the light-receiving element. The housing 713 supports the light-emitting section 711 and the light-receiving section 712. The harness supplies electric power to the light-emitting section 711 and the light-receiving section 712, and transmits an output signal from the light-receiving section 712.

As shown in FIG. 4, the reflecting sensor 710 and the reflecting sensor substrate 720 are mounted to the supporting member 730. The supporting member 730 is secured to the back side of the supporting section cover 500 with a bolt 731.

The second human detecting section 700 includes a determining section 740 (see FIG. 11) that determines whether or not a person exists on the basis of a voltage output from the reflecting sensor 710. The determining section 740 compares an output voltage from the reflecting sensor 710 (may be a voltage that is an amplification of this output voltage) and a predetermined reference voltage. When the output voltage exceeds the reference voltage, the determining section 740 determines that a person exists. The determining section 740 outputs to the controlling device 300 a signal indicating that a person exists. In addition, on the basis of this signal output from the determining section 740, electrical energy is supplied to the reflecting sensor 710 and a notifying section 751 (described later). As described below, the determining section 740 is provided on the first substrate 630, and electric power is supplied to the determining section 740 when the first human detecting section 600 detects entry of a person.

Figure 8:
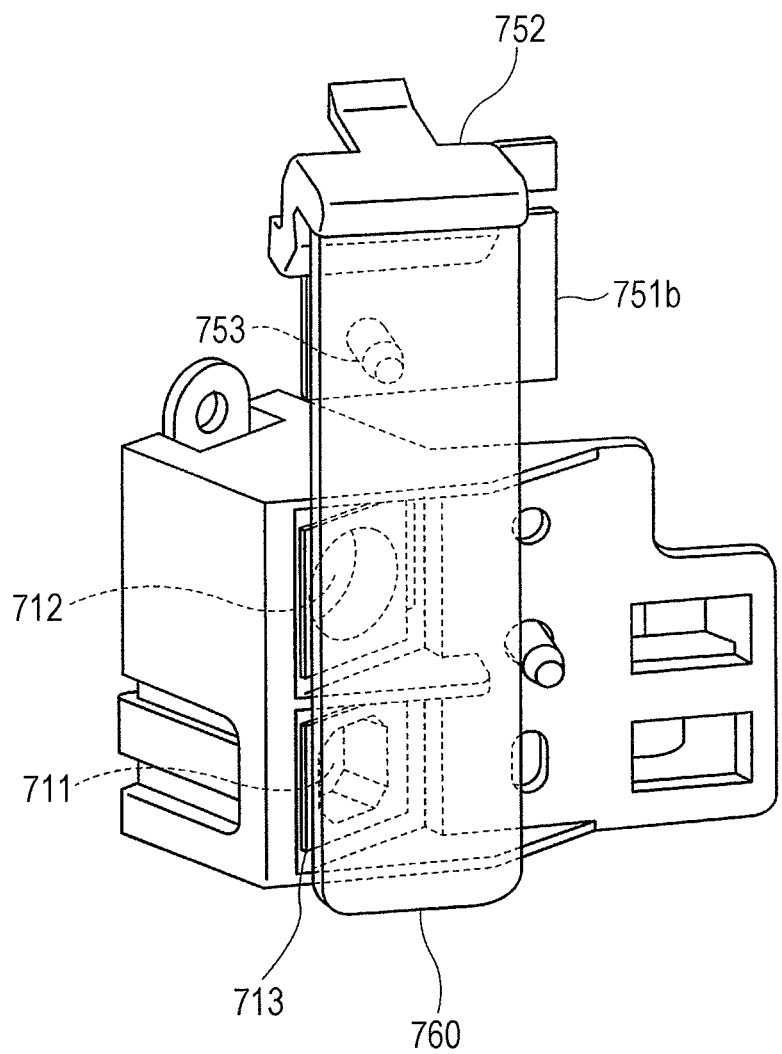
FIG. 8 shows a schematic structure of a transmitting member.

The second human detecting section 700 also includes the notifying section 751 and a light-guiding plate 752 (see FIG. 8). The notifying section 751 notifies a user that a person has been detected by emitting light when the determining section 740 has determined that the reflecting sensor 710 has detected a person. The light-guiding plate 752 is a plate that causes the light emitted from the notifying section 751 to undergo uniform plane emission. The notifying section 751 includes a light-emitting diode (LED) 751a and a notifying section substrate 751b. The light-emitting diode 751a is a semiconductor element that emits light. The notifying section substrate 751b is a control substrate to which the light-emitting diode 751a is mounted. The notifying section substrate 751b is mounted to the image forming apparatus 1 by being secured to the back side of the supporting section cover 500 with a bolt 753.

The second human detecting section 700 also includes a transmitting member 760 disposed in front of the reflecting sensor 710. The transmitting member 760 transmits infrared rays emitted and received by the reflecting sensor 710.

FIG. 8 shows a schematic structure of the transmitting member 760.

Figure 9:
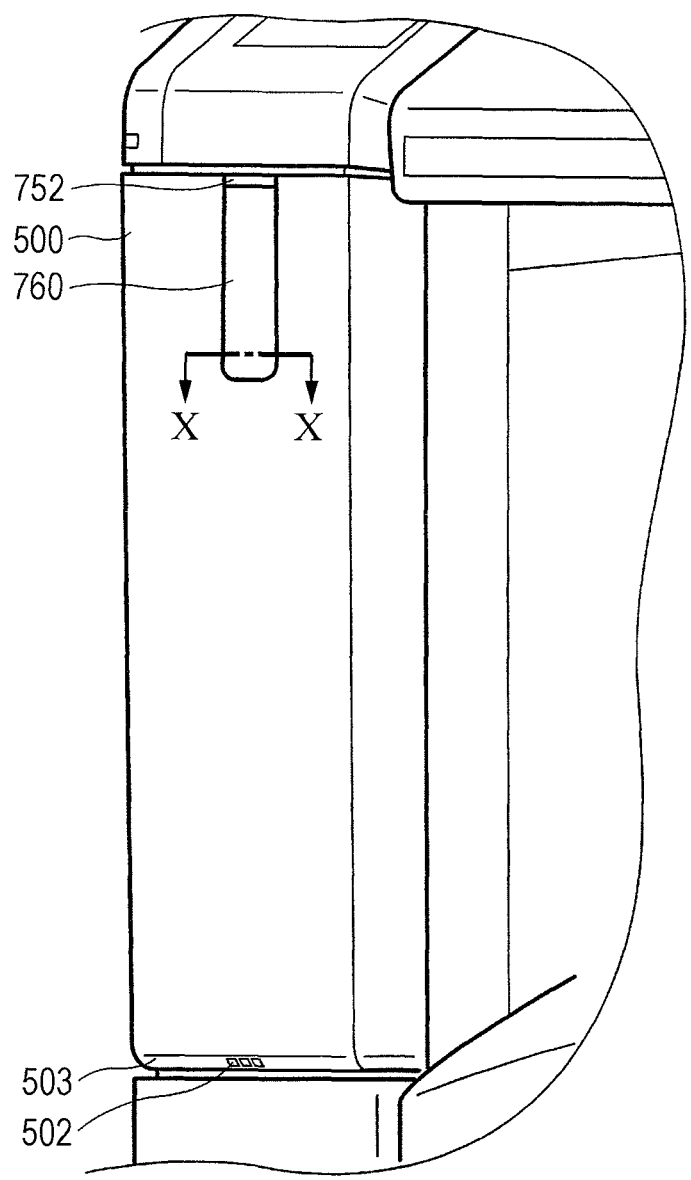
FIG. 9 is an external perspective view of the supporting section cover.

FIG. 9 is a perspective external view of the supporting section cover 500.

The transmitting member 760 is formed of a black material that makes it difficult for a person to see the light-receiving section 712 and the light-emitting section 711 of the reflecting sensor 710. The transmitting member 760 is formed of polycarbonate. The transmitting member 760 is a plate-like member, and is mounted to the supporting section cover 500 so that its front surface is at the same height as the surface of the supporting section cover 500.

Figure 10:
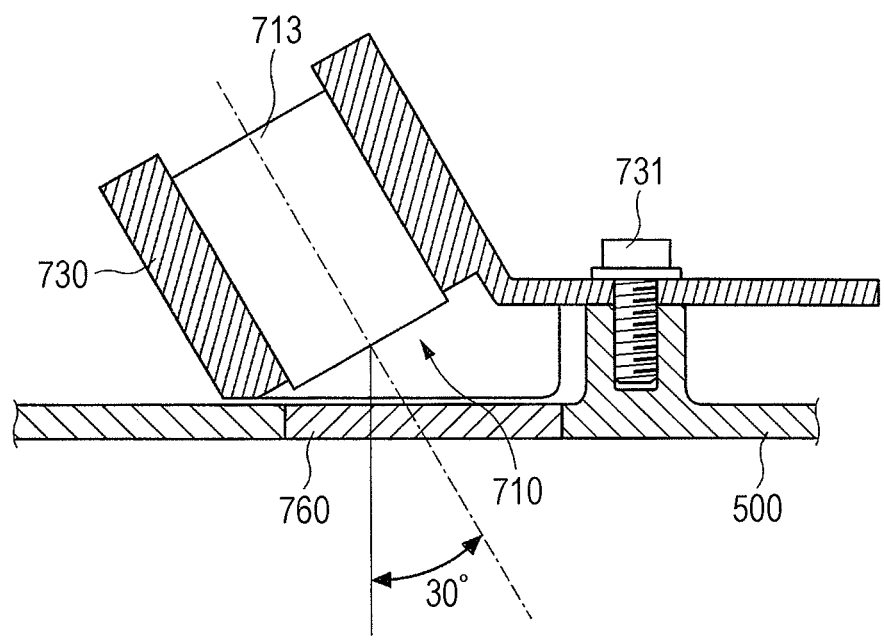
FIG. 10 is a sectional view of a portion taken along line X-X in FIG. 9.

FIG. 10 is a sectional view of a portion taken along line X-X in FIG. 9.

FIGS. 6A to 6C each show a detection area A2 of the reflecting sensor 710.

In the reflecting sensor 710, infrared light from the light-emitting section 711 is directed to and illuminates a predetermined area in front of the user interface 400 of the image forming apparatus 1, and reflected light is received by the light-receiving section 712. The detection area A2 of the reflecting sensor 710 is set to a range of detection of a person existing in an assumed range in which the person operating the user interface 400 is assumed to be positioned. When viewed from above, the detection area A2 of the reflecting sensor 710 is an area situated within the detection area A1 of the first human detecting section 600 (see FIG. 6B). That is, the reflecting sensor 710 is mounted to the supporting section cover 500 so that an optical axis of light emitted from the light-emitting section 711 and the light received by the light-receiving section 712 is inclined by 30 degrees towards the user interface 400 from a horizontal line extending from the far side to the near side. In other words, the reflecting sensor 710 is mounted to the supporting section cover 500 so that the optical axis of the light emitted from the light-emitting section 711 and the light received by the light-receiving section 712 is inclined from the horizontal line extending from the far side to the near side to widen the detection area of the image forming apparatus 1 in the lateral direction so as to make it possible to more precisely detect a person who is positioned in front of the user interface 400 of the image forming apparatus 1.

The detection area A2 of the second human detecting section 700 (reflecting sensor 710) is set so that a distance from the front side of the image forming apparatus 1 in the horizontal direction extending from the far side to the near side is a prescribed distance L2 (see FIGS. 6A to 6C). The prescribed distance L2 may be 35 cm (350 mm). It is possible to change the prescribed distance L2 by, for example, operating a button of the image forming apparatus 1.

Figure 11:
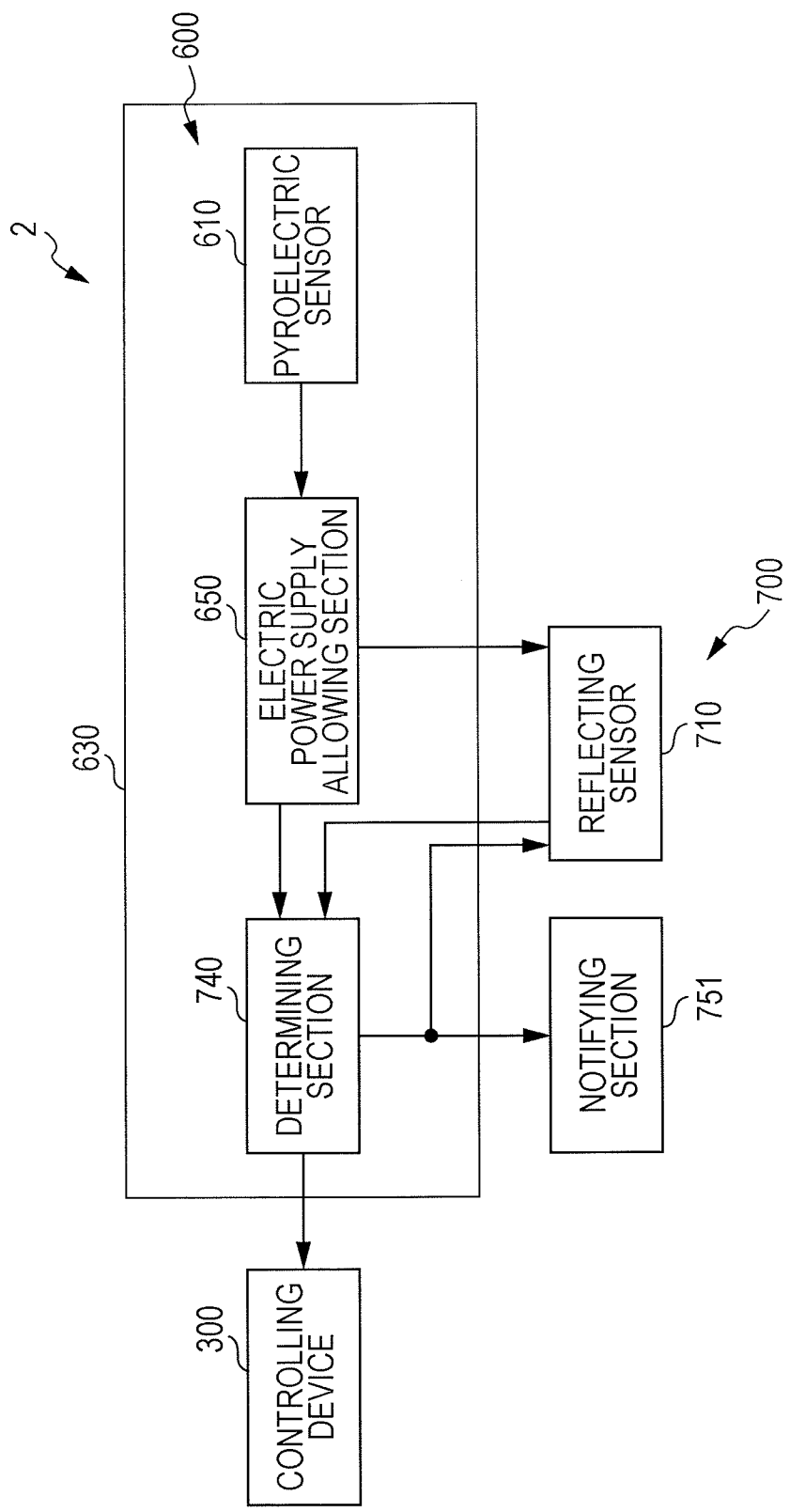
FIG. 11 is a block diagram of the human detecting device.

FIG. 11 is a block diagram of the human detecting device 2.

The first substrate 630 and the reflecting sensor substrate 720 are connected through an electric wire (harness) (not shown) for transmitting an output from the reflecting sensor 710 to the determining section 740 (provided at the first substrate 630) and for supplying electric power from the first substrate 630 to the reflecting sensor 710. The first substrate 630 and the notifying section substrate 751b are connected using an electric wire (harness)(not shown) for supplying electric power from the first substrate 630 to the notifying section 751.

The first substrate 630 is provided with an electric power supply allowing section 650 that allows supply of electrical energy to the reflecting sensor 710 and the determining section 740 for a predetermined period T1 when a signal output from the pyroelectric sensor 610 indicating that a human body has been detected is obtained. The electric power supply allowing section 650 may be a monostable multivibrator that generates a signal that rises in synchronism with a rising edge of the signal from the pyroelectric sensor 610 indicating that a human body has been detected and that is maintained at a high level for the predetermined period T1. The predetermined period T1 may be 30 seconds.

As mentioned above, the first substrate 630 is provided with the pyroelectric sensor 610 and the determining section 740. The determining section 740 may be a comparator serving as an element that compares the output voltage from the reflecting sensor 710 and the predetermined reference voltage, and switches the output depending upon which voltage is higher. When the determining section 740 determines that a person exists on the basis of the output voltage from the reflecting sensor 710, that is, when the reflecting sensor 710 detects a person, the determining section 740 outputs a signal indicating that a person exists to the controlling device 300. In addition, electrical energy is supplied to the reflecting sensor 710, the notifying section 751, and the determining section 740 on the basis of the signal from the determining section 740 indicating that a person exists.

In the image forming apparatus 1 having the above-described structure, when the first human detecting section 600 detects a person, the electric power supply allowing section 650 allows the supply of electric power to the determining section 740 and the reflecting sensor 710 of the second human detecting section 700 during the predetermined period T1. When the second human detecting section 700 detects the person within the predetermined period T1, that is, when the determining section 740 determines that the person exists because the output voltage from the reflecting sensor 710 exceeds the reference voltage, the determining section 740 outputs a signal indicating that the person has been detected to the controlling device 300. This causes the image forming apparatus 1 to be restored to the normal mode from the sleep mode using the controlling device 300. In addition, when the period exceeds the aforementioned predetermined period T1, electric energy is supplied to the determining section 740 and the reflecting sensor 710 of the second human detecting section 700. Electric power is supplied to the notifying section 751 of the second human detecting section 700.

In contrast, when the second human detecting section 700 does not detect the person within the predetermined period T1, the supply of electric energy to the determining section 740 and the reflecting sensor 710 of the second human detecting section 700 is stopped.

In this way, in the image forming apparatus 1 according to the exemplary embodiment, even in the sleep mode, a power supply of the pyroelectric sensor 610 of the first human detecting section 600 is turned on (that is, electric power is supplied to the pyroelectric sensor 610), and a power supply of the second human detecting section 700 is turned on (that is, electrical energy is supplied to, for example, the reflecting sensor 710) when the first human detecting section 600 has detected a person. When the second human detecting section 700 detects the person within the predetermined period T1 from the detection of the person by the first human detecting section 600, the second human detecting section 700 outputs a signal indicating that the person has been detected to the controlling device 300, so that the image forming apparatus 1 is restored to the normal mode from the sleep mode. In contrast, when the second human detecting section 700 does not detect the person within the period T1, the power supply of the second human detecting section 700 is turned off.

Here, the first human detecting section 600 and the second human detecting section 700 will be compared.

Power consumption of the reflecting sensor 710 of the second human detecting section 700 is 0.255 W, whereas power consumption of the pyroelectric sensor 610 of the first human detecting section 600 is 0.002 W, which is 1/128 of the power consumption of the reflecting sensor 710. The time it takes for a person to be detectable by supplying electric power from an off state of the power supply is two to three seconds for the reflecting sensor 710, whereas it is approximately 30 seconds for the pyroelectric sensor 610, which is longer than that of the reflecting sensor 710.

As shown in FIGS. 6A to 6C, the detection area A1 of the first human detecting section 600 is wider than the detection area A2 of the second human detecting section 700 (reflecting sensor 710). When viewed from above, the detection area A2 of the second human detecting section 700 is situated within the detection area A1 of the first human detecting section 600.

As mentioned above, the pyroelectric sensor 610 of the first human detecting section 600 is a sensor that detects that a person has entered the detection area A1 on the basis of the amount of change of infrared rays occurring when a person moves. The pyroelectric sensor 610 does not make a detection when a person stops in front of the image forming apparatus 1 even if the stoppage position is within the detection area A1. Therefore, the first human detecting section 600 may not be able to detect a person even if the person exists in front of the user interface 400 of the image forming apparatus 1 when the person is stopped. For the reflecting sensor 710 of the second human detecting section 700, a range in front of the user interface 400 is the detection area A2. When the person exists in the detection area A2, the reflecting sensor 710 detects the person even if the person is stopped.

Due to the differences between the characteristics of the pyroelectric sensor 610 of the first human detecting section 600 and the characteristics of the reflecting sensor 710 of the second human detecting section 700, the image forming apparatus 1 according to the exemplary embodiment provides the following advantages.

That is, the image forming apparatus 1 according to the exemplary embodiment is formed so that the power supply of the second human detecting section 700 is turned on when the first human detecting section 600 that is always turned on in the sleep mode has detected a person, and so that the image forming apparatus 1 is restored from the sleep mode when the second human detecting section 700 has detected the person. Therefore, it is possible to reduce power consumption compared to that of a structure in which the power supply of the second human detecting section 700 is always turned on during the sleep mode.

Compared to an apparatus that is restored from the sleep mode when the first human detecting section 600 having a wide detection area detects a person, the image forming apparatus 1 according to the exemplary embodiment is capable of reducing erroneous detections in which the apparatus is restored from the sleep mode when, for example, a person or a dog that does not intend to use the apparatus is erroneously detected. That is, since the image forming apparatus 1 according to the exemplary embodiment is formed so that the power supply of the second human detecting section 700 is turned on when the first human detecting section 600 having a wide detection area has detected a person, and so that the image forming apparatus 1 is restored from the sleep mode when the second human detecting section 700 having a narrow detection area has detected the person, it is possible to reduce erroneous detections. That is, the image forming apparatus 1 according to the exemplary embodiment is capable of precisely detecting a person who intends to use the image forming apparatus 1, and being restored from the sleep mode.

The reflecting sensor 710 of the second human detecting section 700 takes two to three seconds (which is a short time) until it becomes capable of detecting a human body by supplying electric power from an off state of the power supply. Therefore, compared to a structure in which an apparatus is restored from the sleep mode by pushing a sleep-mode clearing button provided in or beside the user interface 400, it is possible for the image forming apparatus 1 to be restored from the sleep mode more quickly. In addition, it is possible to omit pressing of the sleep-mode clearing button. Consequently, it is possible to enhance the convenience and merchantability of the image forming apparatus 1 according to the exemplary embodiment.

In the image forming apparatus 1 according to the exemplary embodiment, the human detecting device 2 is mounted to the supporting section cover 500 forming the outer surface at the front side of the reading device supporting section 13. Since the user interface 400 and the front cover 15 exist on the front side of the image forming apparatus 1, the human detecting device 2 may be mounted to the user interface 400 or the front cover 15. However, since many components, such as buttons, a screen, and a substrate, are fitted in a small space of the user interface 400, it is not easy to further dispose the human detecting device 2 in the small space. The front cover 15 is opened and closed for mounting and dismounting, for example, the toner cartridges 29Y, 29M, 29C, and 29K, accommodated in the apparatus housing 12. Therefore, it is difficult to mount the human detecting device 2 to the front cover 15 so as not to interfere with mounting/dismounting paths of the components mounted in the apparatus housing 12. Considering a state in which the front cover 15 is open, the lengths of the harnesses may increase. Therefore, by disposing the human detecting device 2 at the reading device supporting section 13, it is possible to cause the apparatus structure to be simpler than a structure in which the human detecting device 2 is disposed at the user interface 400 or the front cover 15.

In the image forming apparatus 1 according to the exemplary embodiment, the light-emitting section 711 and the light-receiving section 712 of the reflecting sensor 710 of the second human detecting section 700 are disposed side by side in a vertical direction. Therefore, the image forming apparatus 1 has the following advantages.

FIG. 12A shows an area where the light-emitting section 711 of the reflecting sensor 710 emits light and an area where the light-receiving section 712 receives the light. FIG. 12B shows a light emission intensity distribution of the light-emitting section 711. FIG. 12C shows a light reception intensity distribution of the light-receiving section 712.

The area where the light-emitting section 711 of the reflecting sensor 710 emits light is an area that is at +5 degrees and −5 degrees from an optical axis serving as a center. The area where the light-receiving section 712 receives light is an area that is +5 degrees and −5 degrees from an optical axis serving as a center. As shown in FIG. 12B, the light emission intensity distribution of the light-emitting section 711 is a distribution in which light emission intensity is high at a central portion (with the optical axis as the center), and in which the light emission intensity is gradually reduced towards outer sides in a radial direction. As shown in FIG. 12C, similarly, the light reception intensity distribution of the light-receiving section 712 is a distribution in which light reception intensity is high at a central portion (with the optical axis as the center), and in which the light reception intensity is gradually reduced towards outer sides in a radial direction.

Therefore, in the direction in which the light-emitting section 711 and the light-receiving section 712 are disposed side by side, an area that is the light-emitting area but that is not the light-receiving area exists (for example, a point A in FIG. 12A). Light emitted from the light-emitting section 711 strikes such an area, but is not easily received by the light-receiving section 712. Therefore, it becomes difficult to detect a person. Similarly, an area that is the light-receiving area but that is not the light-emitting area exists (for example, a point B in FIG. 12A). At such an area, the light-receiving section 712 receives the light. However, the light emitted from the light-emitting section 711 does not easily strike such an area. Therefore, it becomes difficult to detect a person. In an area in which the light emission intensity of the light-emitting section 711 is high, and in which the light reception intensity of the light-receiving section 712 is low (for example, a point C in FIG. 12A), since the light reception intensity of the light-receiving section 712 is low, it becomes difficult to receive the light, and, thus, to detect a person. Similarly, in an area in which the light reception intensity of the light-receiving section 712 is high, and in which the light emission intensity of the light-emitting section 711 is low (for example, a point D in FIG. 12A), since the light emission intensity of the light-emitting section 711 is low, it becomes difficult to detect a person.

In contrast, in a direction orthogonal to the direction in which the light-emitting section 711 and the light-receiving section 712 are disposed side by side, the optical axis of the light-emitting section 711 and the optical axis of the light-receiving section 712 are basically on the same straight line. Therefore, in this direction, the light-emitting area and the light-receiving area are basically the same. Therefore, the light emission intensity distribution and the light reception intensity distribution are basically the same.

Therefore, the reflecting sensor 710 is capable of more precisely detecting a person in a wide range in the direction orthogonal to the direction in which the light-emitting section 711 and the light-receiving section 712 are disposed side by side than in the direction in which the light-emitting section 711 and the light-receiving section 712 are disposed side by side.

Considering the type of usage of the image forming apparatus 1, a user ordinarily moves in a lateral direction of the image forming apparatus 1, or approaches the front side of the image forming apparatus 1 and positions himself/herself in front of the user interface 400. It is difficult to imagine the user moving in a vertical direction of the image forming apparatus 1.

Considering these facts, in the image forming apparatus 1 according to the exemplary embodiment, the reflecting sensor 710 is disposed so that the direction in which the light-emitting section 711 and the light-receiving section 712 are disposed side by side is a vertical direction. Therefore, compared to when the direction in which the light-emitting section 711 and the light-receiving section 712 are disposed side by side is a lateral direction, the reflecting sensor 710 is capable of detecting more quickly a user that moves in a lateral direction and tries to position himself/herself in front of the user interface 400.

Since the notifying section 751 turns on when the second human detecting section 700 has detected a person, the image forming apparatus 1 according to the exemplary embodiment has the following advantages.

When a user sees that the notifying section 751 is turned on, the user perceives that the sleep mode of the image forming apparatus 1 is cleared, and that the electric power consumption amount is larger than that in the sleep mode. Therefore, turning on the notifying section 751 when the second human detecting section 700 has detected a person makes it is possible to teach the user about what positions the user should exist for the second human detecting section 700 to detect a person and the sleep mode to be cleared. As a result, when the user only approaches the image forming apparatus 1 to take a sheet P placed on the first tray 71 or the second tray 72, it is possible to urge the user to move so as not to be detected by the second human detecting section 700.

In the image forming apparatus 1 according to the exemplary embodiment, the second human detecting section 700 is positioned so as to easily detect a user (person) when the user operates the user interface 400, and so as not to easily detect a user (person) when the user comes to take a sheet P placed on the first tray 71 or the second tray 72. Therefore, the user who only comes to take a sheet P placed on the tray 71 or the tray 72 is capable of moving so as not to be detected by the second human detecting section 700.

That is, in the image forming apparatus 1 according to the exemplary embodiment, the first tray 71 and the second tray 72 are disposed between the image forming section 20 and the image reading device 100. The first discharge rollers 77 and the second discharge rollers 79 are provided at a tray-71 side and a tray-72 side of the reading device supporting section 13 (disposed at either one of end sides (the left side in FIG. 1) in the lateral direction), and discharge sheets P towards the trays 71 and 72. In the second human detecting section 700, the light-emitting section 711 and the light-receiving section 712 are disposed at the aforementioned one end side (the left side in FIG. 1) in the lateral direction, with an area in front of the one end side (the left side in FIG. 1) where the light-emitting section 711 and the light-receiving section 712 are disposed being the detection area A2.

Figure 13A:
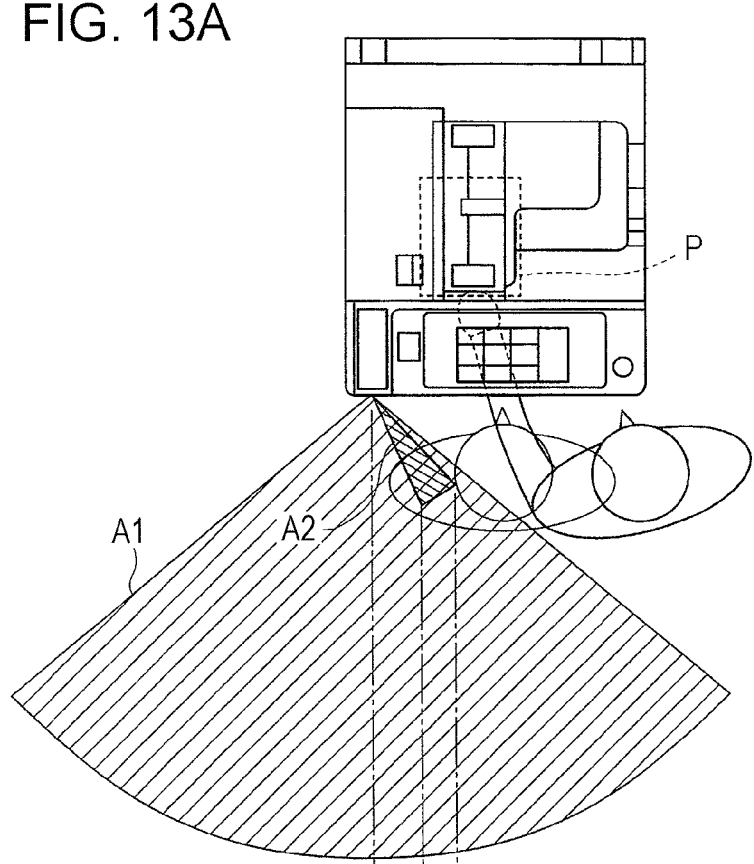
FIGS. 13A and 13B show locations where a user operating a user interface is assumed to be positioned and locations where a user taking a sheet placed on a first tray or a second tray is assumed to be positioned.
Figure 13B:
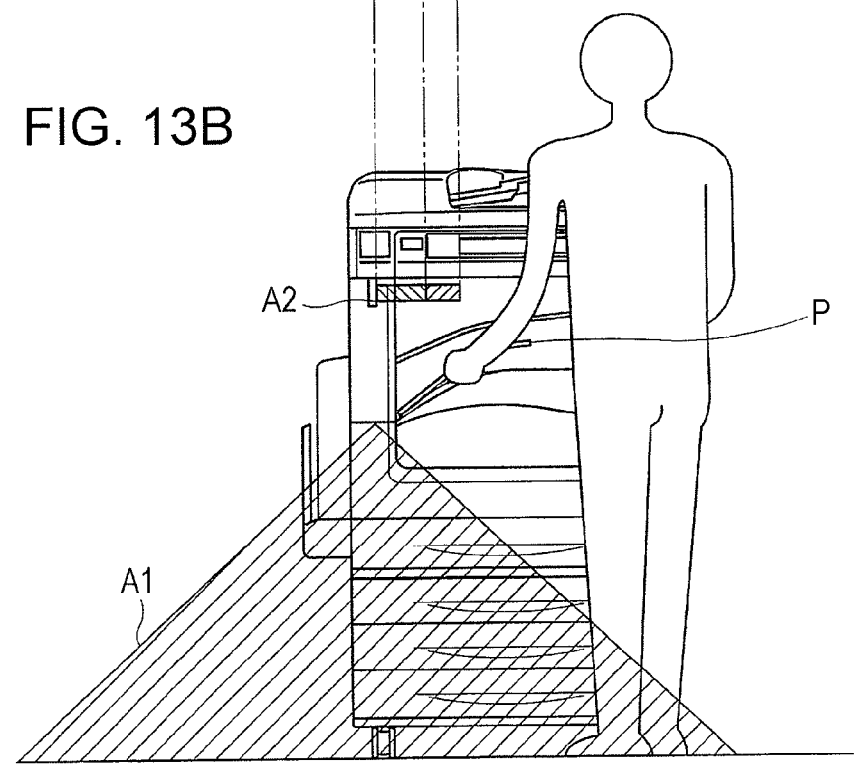

FIGS. 13A and 13B show locations where a user operating the user interface 400 and locations where a user taking a sheet P placed on the first tray 71 or the second tray 72 are assumed to be positioned.

Since the image forming apparatus 1 according to the exemplary embodiment has the aforementioned arrangement and structure, as shown in FIGS. 13A and 13B, it is possible to expect a user who only comes to take a sheet P placed on the first tray 71 or the second tray 72 to move without being detected by the second human detecting section 700. Therefore, it is possible to suppress erroneous detection in which the user who only comes to take a sheet P placed on the tray 71 or the tray 72 is detected.

In the image forming apparatus 1 according to the exemplary embodiment, the first human detecting section 600 is positioned so as to easily make a detection when a user (person) approaches the user interface 400 and so as not to easily make a detection when a user (person) takes a sheet P placed on the first tray 71 or the second tray 72 from the lateral direction. Therefore, it is possible for the user who only comes to take a sheet P placed on the tray 71 or the tray 72 to move so as not to be detected by the first human detecting section 600.

That is, in the image forming apparatus 1 according to the exemplary embodiment, the first tray 71 and the second tray 72 are disposed between the image forming section 20 and the image reading device 100. The first discharge rollers 77 and the second discharge rollers 79 are provided at the tray-71 side and the tray-72 side of the reading device supporting section 13 (disposed at either one of the end sides (the left side in FIG. 1) in the lateral direction), and discharge sheets P towards the trays 71 and 72. The first human detecting section 600 is disposed at the one end side (left side) in the lateral direction, with an area in front of the one end side where the first human detecting section 600 is disposed being the detection area A1.

Since the image forming apparatus 1 according to the exemplary embodiment has the aforementioned arrangement and structure, as shown in FIGS. 13A and 13B, it is possible to expect a user who only comes to take a sheet P placed on the first tray 71 or the second tray 72 to move without being detected by the first human detecting section 600. Therefore, it is possible to suppress the turning on of the power supply of, for example, the reflecting sensor 710 as a result of the first human detecting section 600 detecting a user who only comes to take a sheet P placed on the tray 71 or the tray 72.

In addition, in the first human detecting section 600, an area in front of the image forming apparatus 1 is the detection area A1, and the first tray 71 and the second tray 72 are not detection areas. Therefore, detection by the first human detecting section 600 of sheets P discharged towards the trays 71 and 72 is suppressed. This makes it possible to suppress the turning on of the power supply of, for example, the reflecting sensor 710 as a result of the first human detecting section 600 detecting the sheets P discharged towards the trays 71 and 72.

In the above-described exemplary embodiment, although the case in which the determining section 740 and the electric power supply allowing section 650 are formed of hardware is given as an example, the present invention is not necessarily limited to such a structure. As long as operations similar to those described above are capable of being performed, any other structure may be used. For example, the determining section 740 and the electric power supply allowing section 650 may be formed of a central processing unit (CPU) and a memory, and operated by software. Electric power may be supplied to the CPU and the memory when the first human detecting section 600 has detected a person.

The steps of a sleep mode clearing operation when the determining section 740 and the electric power supply allowing section 650 are formed of CPU and a memory will be described.

Figure 14:
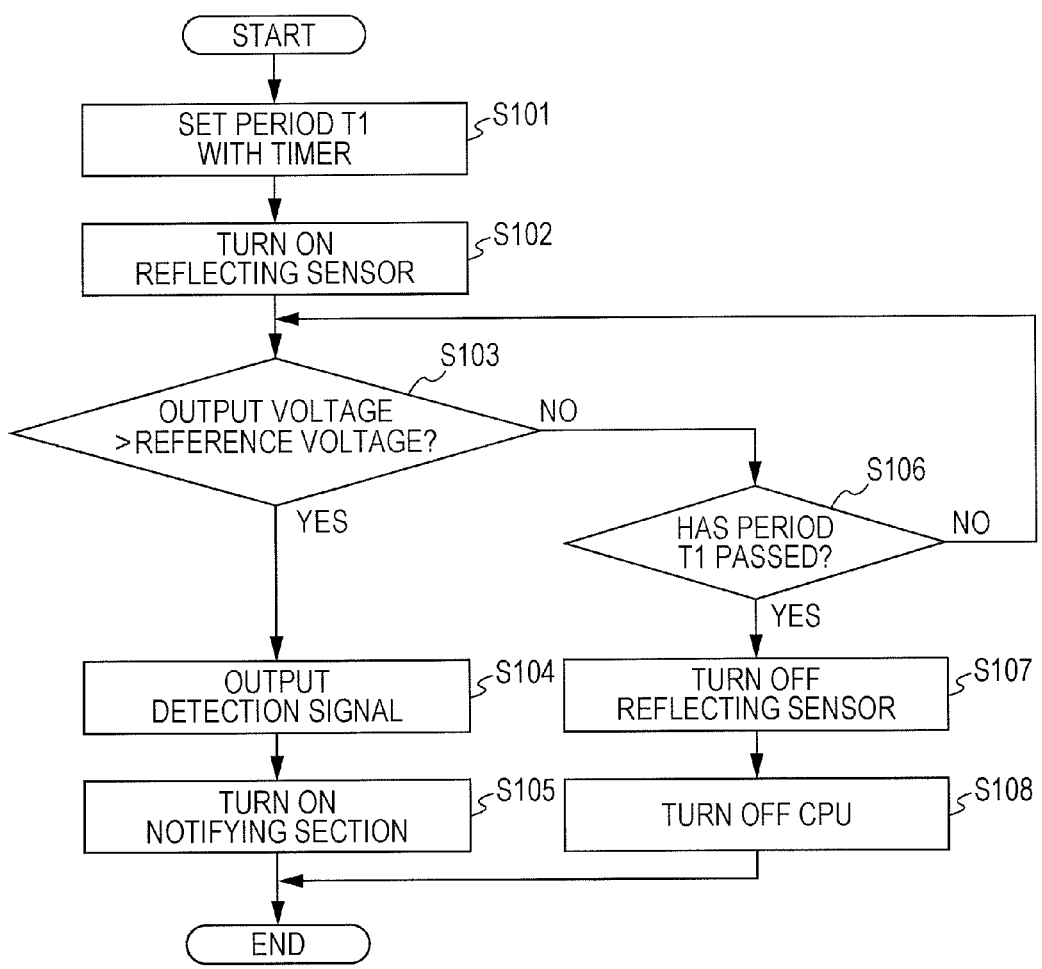
FIG. 14 is a flowchart showing the steps of a sleep mode clearing operation performed by a CPU.

FIG. 14 is a flowchart showing the steps of a sleep mode clearing operation performed by the CPU. When the first human detecting section 600 detects a person, electric power is supplied to the CPU to turn on the power supply thereof. When the CPU is turned on, the sleep mode clearing operation is executed.

First, the CPU sets a predetermined period T1 by a timer in Step S101. The term "Step" will hereunder be abbreviated to "S". Then, supply of electrical energy to the reflecting sensor 710 is started in S102. Thereafter, it is determined whether or not the output voltage from the reflecting sensor 710 has exceeded a predetermined reference voltage in S103. If it is determined that the output voltage from the reflecting sensor 710 has exceeded the predetermined reference voltage in S103 ("Yes" in S103), the second human detecting section 700 outputs to the controlling device 300 a signal indicating that a person has been detected in S104. This causes the sleep mode to be cleared, so that the image forming apparatus 1 is restored from the sleep mode. Then, electric power is supplied to the notifying section 751 to turn on the notifying section 751 in S105.

In contrast, if it is determined that the output voltage from the reflecting sensor 710 does not exceed the predetermined reference voltage in S103 ("No" in S103), it is determined whether or not the period T1 has passed in S106. If it is determined that the period T1 has passed in S106 ("Yes" in S106), the supply of electrical energy to the reflecting sensor 710 is stopped in S107, and the supply of electric power to the CPU itself is also stopped in S108. In contrast, if it is determined that the period T1 has not passed ("No" in S106), S103 and the following steps are performed.

Figure 15:
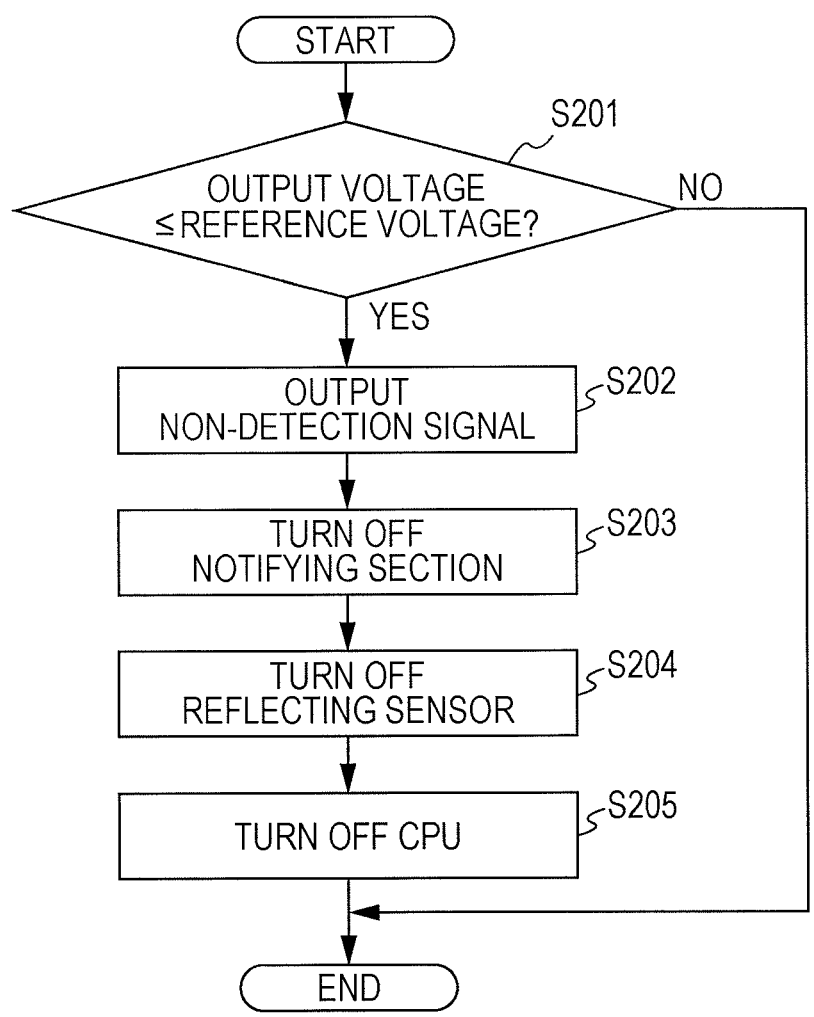
FIG. 15 is a flowchart showing the steps of a changing-to-sleep-mode operation performed by the CPU.

FIG. 15 is a flowchart showing the steps of a changing-to-sleep-mode operation performed by the CPU. After the CPU has cleared the sleep mode by performing the steps of the sleep mode clearing operation, that is, after the second human detecting section 700 has output to the controlling device 300 a signal indicating that a person has been detected in S104, the CPU repeatedly executes the operation for each predetermined period.

First, the CPU determines whether or not the output voltage from the reflecting sensor 710 is less than or equal to the predetermined reference voltage in S201. If the CPU determines that the output voltage from the reflecting sensor 710 is less than or equal to the predetermined reference voltage ("Yes" in S201), the second human detecting section 700 outputs to the controlling device 300 a signal indicating that the person is not detected (a non-detection signal) in S202. This causes the mode of the image forming apparatus 1 to change to the sleep mode. In addition, the supply of electric power to the notifying section 751 is stopped to turn off the notifying section 751 in S203. Then, the supply of electrical energy to the reflecting sensor 710 is stopped in S204, and the supply of electric power to the CPU itself is stopped in S205.

The steps of the changing-to-sleep-mode operation are described using the flowchart shown in FIG. 15. However, changing to the sleep mode may be performed after the passage of a predetermined period T2 from when the second human detecting section 700 no longer detects the person.

Figure 16:
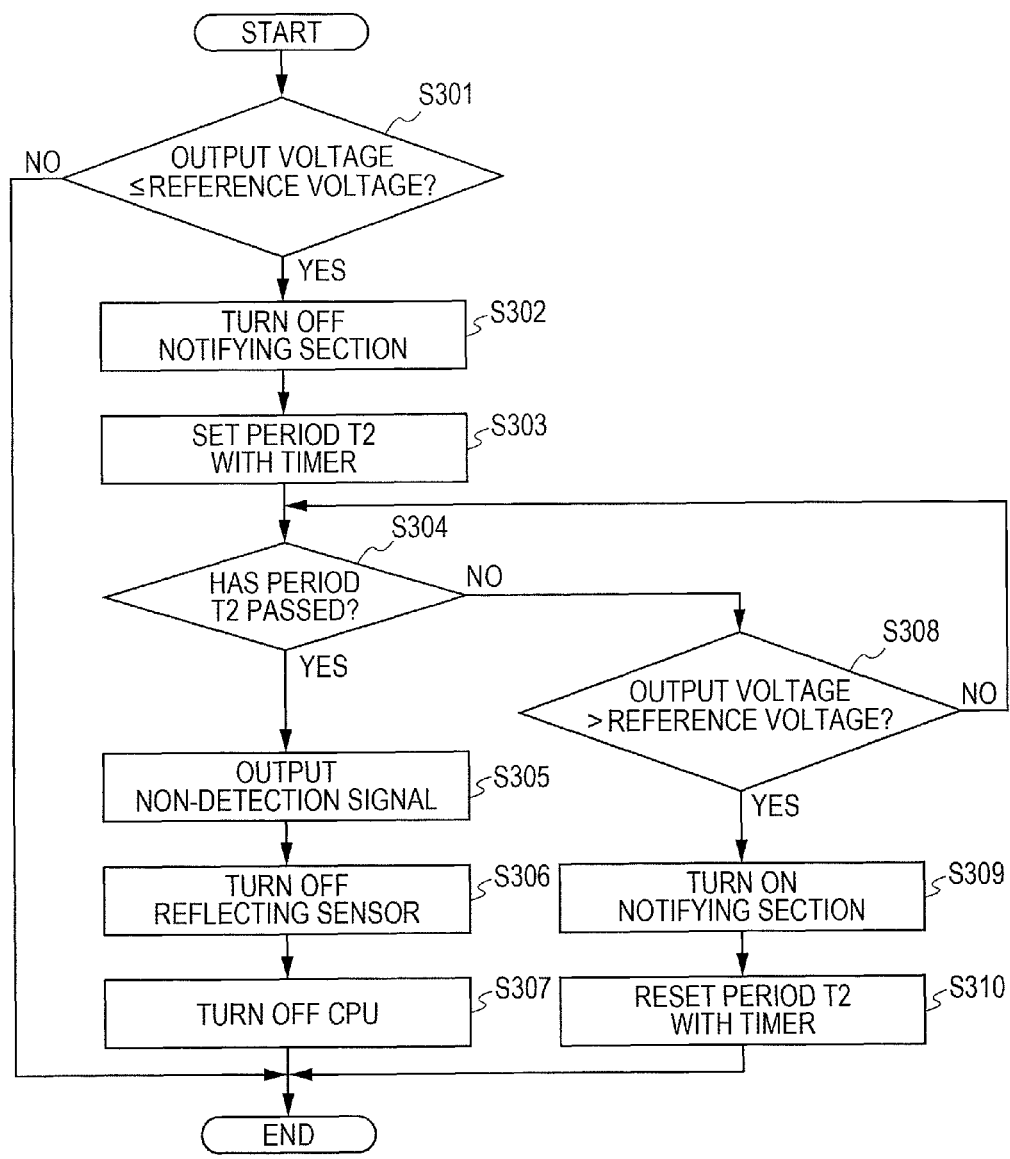
FIG. 16 is a flowchart showing the steps of another changing-to-sleep-mode operation performed by the CPU.

FIG. 16 is a flowchart showing the steps of another changing-to-sleep-mode operation performed by the CPU.

First, the CPU determines whether or not the output voltage from the reflecting sensor 710 is less than or equal to the predetermined reference voltage in S301. If the CPU determines that the output voltage from the reflecting sensor 710 is less than or equal to the reference voltage ("Yes" in S301), the supply of electric power to the notifying section 751 of the second human detecting section 700 is stopped to turn off the notifying section 751 in S302. Then, the period T2 is set using a timer in S303. Thereafter, the CPU determines whether or not the period T2 has passed in S304. Then, if the period T2 has passed ("Yes" in S304), the second human detecting section 700 outputs to the controlling device 30 a signal indicating that the person is not detected in S305. This causes the mode of the image forming apparatus 1 to be changed to the sleep mode. The supply of electrical energy to the reflecting sensor 710 is stopped in S306, and the supply of electric power to the CPU itself is also stopped in S307.

When the CPU determines that the period T2 has not passed in S304 ("No" in S304), the CPU determines whether or not the output voltage from the reflecting sensor 710 exceeds the predetermined reference voltage in S308. If the output voltage from the reflecting sensor 710 exceeds the reference voltage ("Yes" in S308), electric power is supplied to the notifying section 751, so that the notifying section 751 turns on in S309, and a timer for the period T2 is reset in S310. In contrast, if the output voltage from the reflecting sensor 710 does not exceed the predetermined reference voltage ("No" in S308), S304 and the subsequent steps are carried out.

In the changing-to-sleep-mode operation described using the flowchart of FIG. 16, the second human detecting section 700 outputs to the controlling device 300 a signal indicating that the person is not detected after the passage of the period T2 after the output voltage from the reflecting sensor 710 has become less than or equal to the reference voltage. However, the present invention is not particularly limited thereto. When the CPU determines that the output voltage from the reflecting sensor 710 has become less than or equal to the reference voltage ("Yes" in S301), the second human detecting section 700 outputs to the controlling device 300 a signal indicating that the person is not detected. After receiving the signal, the controlling device 300 may measure the period T2 by itself. If the controlling device 300 does not receive again within the period T2 a signal indicating that the second human detecting section 700 has detected the person, the mode of the image forming apparatus 1 may be changed to the sleep mode.

Figure 17B:
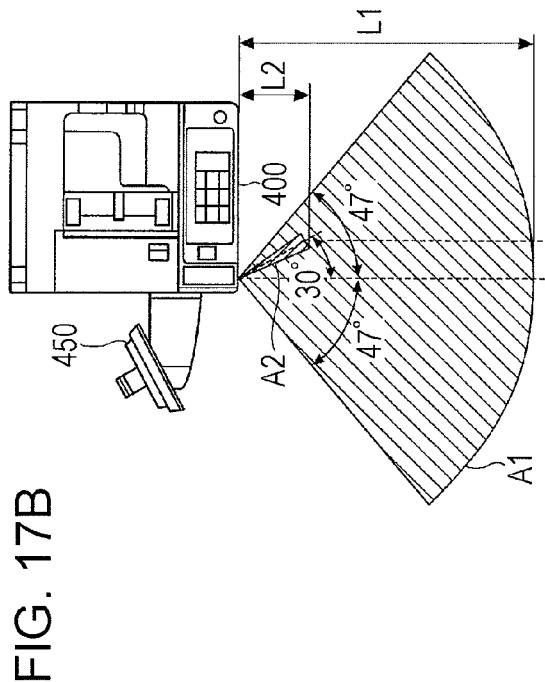
FIGS. 17A to 17C each show a schematic structure of an image forming apparatus according to another exemplary embodiment.
Figure 17A:
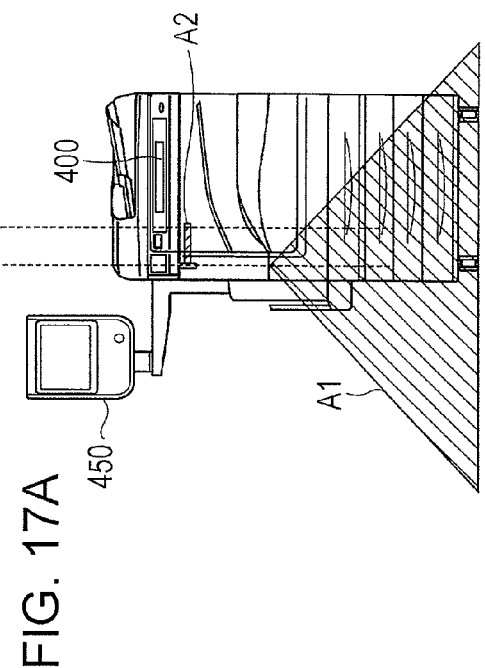
Figure 17C:
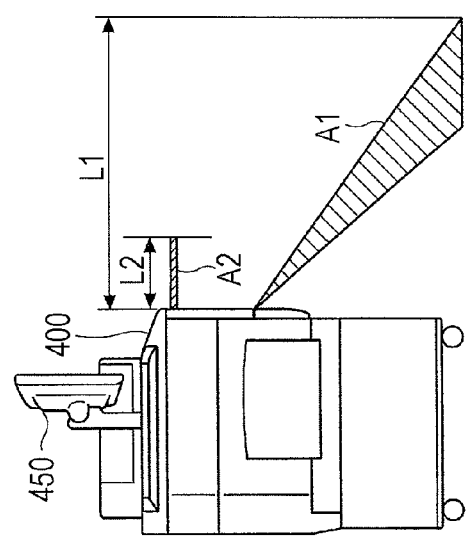

FIGS. 17A to 17C each show a schematic structure of an image forming apparatus 1 according to another exemplary embodiment.

When the image forming apparatus 1 is provided with another user interface 450 disposed so as to be orthogonal to a floor surface in addition to a user interface 400 provided so as to be parallel to the floor surface, the user interface 450 is disposed so that a human detecting device 2 is disposed between the user interface 400 and the other user interface 450.

Accordingly, using a first human detecting section 600, it is possible to detect with high precision both a person approaching the user interface 400 and a person approaching the user interface 450. In addition, using a second human detecting section 700, it is possible to detect with high precision a person trying to operate the user interface 400 and a person trying to operate the user interface 450.

In the above-described exemplary embodiment, an optical axis of light that is emitted by a light-emitting section 711 of a reflecting sensor 710 of the second human detecting section 700 and light that is received by a light-receiving section 712 of the reflecting sensor 710 of the second human detecting section 700 are disposed so as to incline 30 degrees towards the user interface 400 from a horizontal line extending from a far side to a near side. However, the present invention is not particularly limited thereto when a multiple number of user interfaces are provided. A detection area A2 of the second human detecting section 700 may be disposed between an area in front of the user interface 400 and an area in front of the user interface 450. This makes it possible to detect with high precision both a person trying to operate the user interface 400 and a person trying to operate the user interface 450.

In the above-described exemplary embodiment, the human detecting device 2 includes two detecting sections having different detection areas and electric power consumption amounts, that is, the first human detecting section 600 and the second human detecting section 700. However, the present invention is not particularly limited thereto. That is, the human detecting device 2 may include a multiple number of human detecting sections having different detection areas and power consumptions. For example, the human detecting device 2 may include three human detecting sections having different detection areas, in which, when the human detecting section having the largest detection area detects a person, electric power is supplied to the human detecting section having the second largest detection area to set the human detecting section having the second largest detection area in a human detectable state, and in which, when the human detecting section having the second largest detection area detects the person, electric power is supplied to the human detecting section having the smallest detection area to set the human detecting section having the smallest detection area in a human detectable state. When the human detecting section having the smallest detection area detects the person, a signal indicating this is output to the controlling device 300, so that the mode of the image forming apparatus 1 is restored from the sleep mode. In such a structure, when the electric power consumption amount of the human detecting section having the smallest detection area is larger than the electric power consumption amounts of the other human detecting sections, it is possible to reduce the electric power consumption amount compared to that of a structure in which electric power is always supplied to a human detecting section having the smallest detection area in the sleep mode.

Although, in the human detecting device 2 according to the above-described exemplary embodiment, electric power is supplied to the second human detecting section 700 when the first human detecting section 600 detects a person, the present invention is not particularly limited thereto. In place of the first human detecting section 600, as a device that detects a person approaching the detection area A2 of the second human detecting section 700, for example, a vibration detecting sensor may be used. The vibration detecting sensor detects vibration in a range that is wider than the detection area A2 of the second human detecting section 700. The electric power consumption amount of the vibration detecting sensor is smaller than that of the second human detecting section 700. Electric power may be supplied to the second human detecting section 700 when the vibration detecting sensor detects vibration resulting from a person approaching the vibration detecting sensor. Further, in place of the first human detecting section 600, other sensors, such as a temperature sensor that detects the approach of a person when the temperature changes or a brightness sensor that detects that the vicinity of the image forming apparatus 1 has become bright as a result of turning on, for example, a fluorescent lamp, may also be used.

The image forming apparatus 1 according to the exemplary embodiment is suitably set at places where a person that does not use the apparatus may pass close to the apparatus, such as offices, plants, warehouses, shops, hotels, stations, airports, harbors, parking spaces, roadsides, passages, markets, tourist facilities, event sites, schools, libraries, government offices, and other public facilities. That is, the image forming apparatus 1 is suitably set at places where a person that uses the image forming apparatus 1 and a person that only passes near the image forming apparatus 1 without using the image forming apparatus exist. By disposing the image forming apparatus 1 at such places, it is possible to reduce power consumption and to enhance the convenience of the image forming apparatus 1.

When the human detecting device 2 is provided in the image forming apparatus 1, the human detecting device 2 need not be built in the image forming apparatus 1. For example, the human detecting device 2 may be formed as a device that is separate from the image forming apparatus 1, and connected to the image forming apparatus 1 with, for example, a harness. In addition, a component of the human detecting device 2, such as the first human detecting section 600, may be formed separately from the image forming apparatus 1. The human detecting device 2 and the image forming apparatus 1 may be connected to each other in any way when the human detecting device 2 is formed as a device that is separate from the image forming apparatus 1 as long as it is possible to give a message that the human detecting device 2 has detected a person. The human detecting device 2 and the image forming apparatus 1 may be connected to each other using wires or by a wireless method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a forming section that forms an image on a recording medium;
a reading device that is disposed above the forming section;
a connecting section that is disposed at one of two opposing lateral sides of the image forming apparatus, the connecting section connecting the forming section and the reading device;
an operating section that is disposed in front of the reading device;
a sensor configured to detect a human,
wherein the sensor is configured to detect a detection range, the detection range including a first range in front of the forming section, but excluding a second range in front of the forming section, the second range being directly adjacent to a vertical midline of a front side of the forming section,
wherein an optical axis of light of the sensor is horizontally inclined at a predetermined angle from the vertical midline, and
wherein the sensor is disposed at a surface of the front side of the image forming apparatus and is disposed on the connecting section.

2. The image forming apparatus according to claim 1, wherein the sensor is disposed at a surface of one of the two opposing lateral sides on the front side of the image forming apparatus.

3. The image forming apparatus according to claim 1, wherein the sensor is disposed at a surface of the front side of the image forming apparatus and external to a discharging section,
wherein the discharging section discharges the recording medium on which the image has been formed by the forming section.

4. The image forming apparatus according to claim 1, further comprising:
a discharging section comprising a discharging roller,
wherein the discharging section discharges the recording medium on which the image has been formed by the forming section,
wherein the sensor is disposed at a surface of the front side of the image forming apparatus and external to the discharging roller.

5. The image forming apparatus according to claim 1, further comprising:
a notifying means notifies the human of the sensor detecting the human in response to the sensor detecting the human.

6. The image forming apparatus according to claim 1, wherein the sensor is disposed at a surface of one of two opposing lateral sides on the front side of the image forming apparatus.

7. The image forming apparatus according to claim 2, wherein the second range in front of the forming section extends from the vertical midline of the front side of the forming section to an end of an opposing lateral side in which the sensor is not disposed and opposed to the one of the two opposing lateral sides.

8. An image forming apparatus comprising:
an forming section that forms an image on a recording medium;
a reading device that is disposed above the forming section;
a connecting section that is disposed at one of two opposing lateral sides of the image forming apparatus, the connecting section connecting the forming section and the reading device;
an operating section that is disposed in front of the reading device; and
a sensor configured to detect a human,
wherein the sensor is disposed at a surface of one of the two opposing lateral sides on the front side of the image forming apparatus,
an optical axis of the sensor is horizontally inclined at a predetermined angle from a vertical midline of a front side of the forming section, and
wherein the sensor is disposed on the connecting section.

9. The image forming apparatus according to claim 8, wherein the sensor is disposed external to a discharging section,
wherein the discharging section discharges the recording medium on which the image has been formed by the forming section.

10. The image forming apparatus according to claim 8, further comprising:
a discharging section comprising a discharging roller,
wherein the discharging section discharges the recording medium on which the image has been formed by the forming section,
wherein the sensor is disposed external to the discharging roller.

11. The image forming apparatus according to claim 8, further comprising:
a notifying means notifies the human of the sensor detecting the human in response to the sensor detecting the human.

12. The image forming apparatus according to claim 8, wherein the second range in front of the forming section extends from the vertical midline of the front side of the forming section to an end of an opposing lateral end side in which the sensor is not disposed and opposed to the one of the two opposing lateral sides.

13. An image forming apparatus comprising:
a forming section forms an image on a recording medium; and
a sensor is configured to detect a human in a detection range, the detection range including a first range in front of the forming section, but excluding a second range directly adjacent to a vertical midline of a front side of the forming section,
wherein an optical axis of light of the sensor is horizontally inclined at a predetermined angle from the vertical midline, and
wherein the sensor is disposed at a surface of the front side of the image forming apparatus and is disposed on a connecting section.

14. The image forming apparatus according to claim 13, wherein the sensor is disposed at a surface of one of the two opposing lateral sides on the front side of the image forming apparatus.

15. The image forming apparatus according to claim 13, wherein the sensor is disposed at a surface of the front side of the image forming apparatus and external to a discharging section,
wherein the discharging section discharges the recording medium on which the image has been formed by the forming section.

16. The image forming apparatus according to claim 13, further comprising:
a discharging section comprising a discharging roller, wherein the discharging section discharges the recording material on which the image has been formed by the forming section, wherein the sensor is disposed at a surface of the front side of the image forming apparatus and external to the discharging roller.

17. The image forming apparatus according to claim 13, further comprising:

a notifying means notifies the human of the sensor detecting the human in response to the sensor detecting the human.

18. The image forming apparatus according to claim 13, wherein the sensor is disposed at a surface of one of two opposing lateral sides on the front side of the image forming apparatus.

19. The image forming apparatus according to claim 14, wherein the second range in front of the forming section extends from the vertical midline of the front side of the forming section to an end of the opposing lateral end side in which the sensor is not disposed and opposed to the one of the two opposing lateral end sides.

* * * * *